United States Patent
Naik et al.

(10) Patent No.: US 12,486,982 B2
(45) Date of Patent: Dec. 2, 2025

(54) COMBUSTOR HAVING A MAIN CHAMBER AND ONE OR MORE TRAPPED VORTEX CAVITIES

(71) Applicant: General Electric Company, Evendale, OH (US)

(72) Inventors: Pradeep Naik, Bengaluru (IN); Clayton S. Cooper, Loveland, OH (US); Perumallu Vukanti, Bengaluru (IN); Michael A. Benjamin, Cincinnati, OH (US); Steven C. Vise, Loveland, OH (US); Sripathi Mohan, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/949,096

(22) Filed: Nov. 15, 2024

(65) Prior Publication Data

US 2025/0075911 A1    Mar. 6, 2025

Related U.S. Application Data

(62) Division of application No. 18/453,500, filed on Aug. 22, 2023, now Pat. No. 12,152,779.

(51) Int. Cl.
*F23R 3/16* (2006.01)
*F23L 7/00* (2006.01)

(52) U.S. Cl.
CPC ............... *F23R 3/16* (2013.01); *F23L 7/005* (2013.01)

(58) Field of Classification Search
CPC .... F23R 3/16; F23R 3/34; F23R 3/346; F23L 7/005; F02C 3/30; F02C 3/305
See application file for complete search history.

(56) References Cited

U.S. PATENT DOCUMENTS

| | | |
|---|---|---|
| 4,374,466 A | 2/1983 | Sotheran |
| 4,458,479 A * | 7/1984 | Reider ...................... F23R 3/60  60/751 |
| 4,955,191 A | 9/1990 | Okamoto et al. |
| 5,009,070 A | 4/1991 | Tizuka et al. |
| 5,121,597 A | 6/1992 | Urushidani et al. |
| 6,951,108 B2 | 10/2005 | Burrus et al. |
| 7,284,378 B2 | 10/2007 | Amond, III et al. |
| 7,536,862 B2 | 5/2009 | Held et al. |
| 8,272,219 B1 | 9/2012 | Johnson et al. |
| 8,931,283 B2 | 1/2015 | Khan et al. |

(Continued)

FOREIGN PATENT DOCUMENTS

WO    2022101608 A1    5/2022

*Primary Examiner* — Steven M Sutherland
(74) *Attorney, Agent, or Firm* — Venable LLP; Michele V. Frank

(57) ABSTRACT

A combustor having a main chamber and a trapped vortex cavity. The main chamber includes an outer liner and an inner liner. The trapped vortex cavity extends from at least one of the outer liner or the inner liner. A plurality of mixing assemblies operably injects a fuel-air mixture into the trapped vortex cavity to produce combustion gases. The trapped vortex cavity injects the combustion gases into the main chamber. A steam system is in fluid communication with the main chamber. The steam system operably injecting steam into the main chamber such that the steam flows downstream of the trapped vortex cavity.

20 Claims, 18 Drawing Sheets

(56) References Cited

U.S. PATENT DOCUMENTS

| | | | |
|---|---|---|---|
| 9,103,547 | B2 | 8/2015 | Eroglu et al. |
| 10,976,052 | B2 | 4/2021 | Boardman et al. |
| 10,982,853 | B2 | 4/2021 | Polyzopoulos et al. |
| 11,181,269 | B2 | 11/2021 | Boardman et al. |
| 2002/0190137 | A1 | 12/2002 | Cheng |
| 2009/0077972 | A1 | 3/2009 | Singh |
| 2011/0005189 | A1 | 1/2011 | Uhm et al. |
| 2013/0318992 | A1 | 12/2013 | Carnell, Jr. et al. |
| 2014/0096502 | A1 | 4/2014 | Karlsson et al. |
| 2019/0017441 | A1 | 1/2019 | Venkatesan et al. |
| 2021/0293412 | A1 | 9/2021 | Boardman et al. |
| 2022/0003406 | A1 | 1/2022 | Ruiz |

\* cited by examiner

COMBUSTOR HAVING A MAIN CHAMBER AND ONE OR MORE TRAPPED VORTEX CAVITIES

CROSS-REFERENCE TO RELATED APPLICATIONS

This application is a divisional of U.S. patent application Ser. No. 18/453,500 filed on Aug. 22, 2023, the contents of which are hereby incorporated by reference in their entirety.

TECHNICAL FIELD

The present disclosure relates generally to combustors, for example, for turbine engines.

BACKGROUND

A turbine engine generally includes a fan and a core section arranged in flow communication with one another. A combustor is arranged in the core section to generate combustion gases for driving a turbine of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
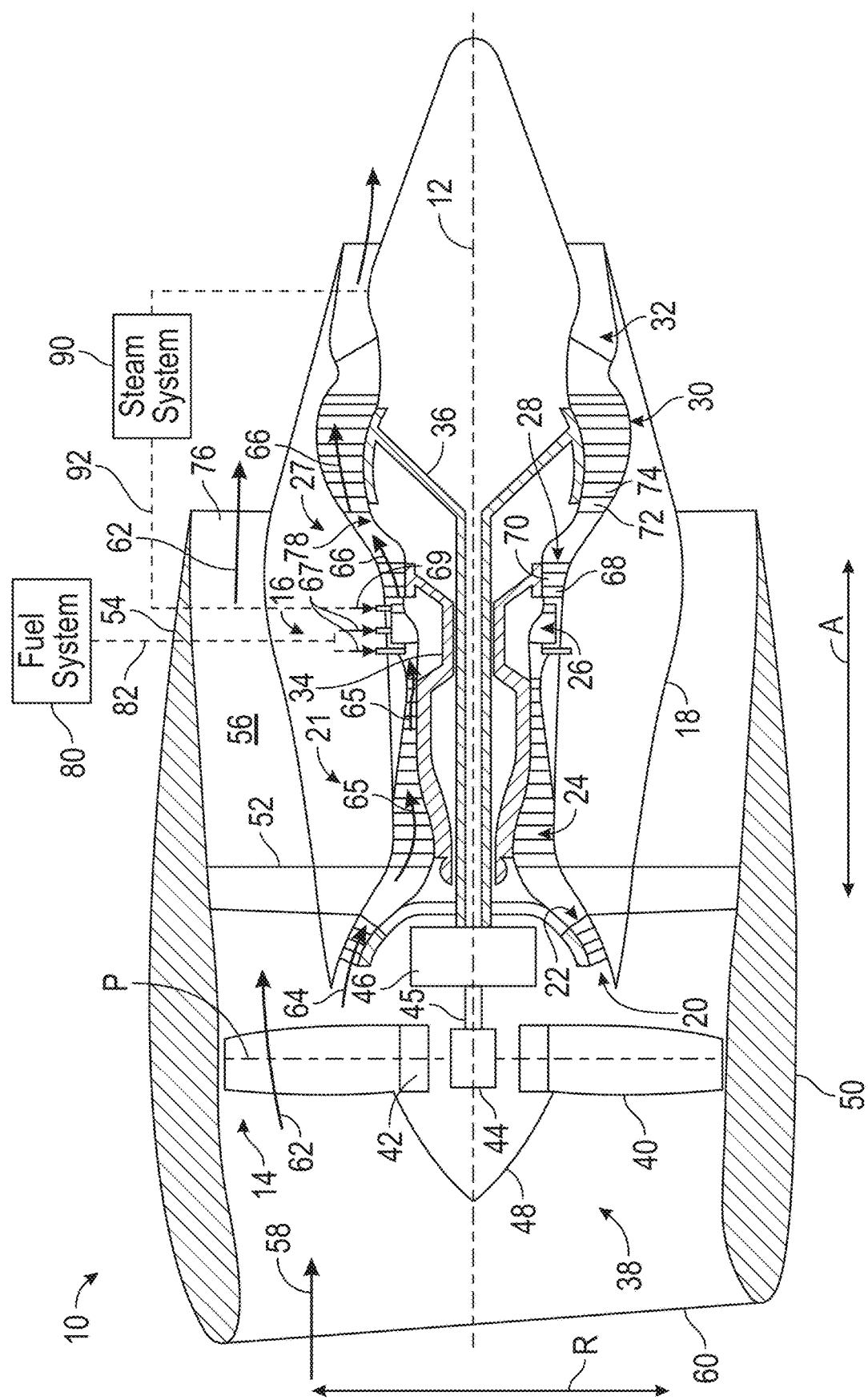
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, or relative power outputs within an engine unless otherwise specified. For example, a "low-power" setting defines the engine configured to operate at a power output lower than a "high-power" setting of the engine, and a "mid-level power" setting defines the engine configured to operate at a power output higher than a "low-power" setting and lower than a "high-power" setting. The terms "low," "mid" (or "mid-level"), or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The various power levels of the turbine engine or of the combustor detailed herein are defined as a percentage of a sea level static (SLS) maximum engine rated thrust. A low-power operation includes, for example, less than thirty percent (30%) of the SLS maximum engine rated thrust of the turbine engine. A mid-level power operation includes, for example, thirty percent (30%) to eighty-five (85%) of the SLS maximum engine rated thrust of the turbine engine. A high-power operation includes, for example, greater than eighty-five percent (85%) of the SLS maximum engine rated thrust of the turbine engine. The values of the thrust for each of the low-power operation, the mid-level power operation, and the high-power operation of the turbine engine or of the combustor are exemplary only, and other values of the thrust can be used to define the low-power operation, the mid-level power operation, and the high-power operation.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, the terms "trapped vortex cavity" or "TVC" generally refer to one or more cavities of a combustor that are in fluid communication with a main chamber of the combustor and that at least partially mix a fuel in a swirling vortex of compressed air within the one or more cavities.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

Combustors for turbine engines, such as turbine engines for aircraft, ignite fuel and air mixtures to produce combustion gases, which in turn drive one or more turbines of the turbine engine, thereby rotating one or more loads (e.g., a fan, a propeller, etc.). Air pollution concerns have led to stricter combustion emissions standards. Such standards regulate the emission of nitrogen oxide ($NO_x$), non-volatile particulate matter (nvPM), as well as other types of exhaust emissions, from the turbine engine. The nvPM includes, for example, soot, smoke, or the like. Generally, $NO_x$ is formed during the combustion process due to high flame temperatures in the combustor. Turbine engine design tradeoffs are necessary to meet requirements for noise, emissions, fuel burn, cost, weight, and performance. As temperatures in the combustor increase, $NO_x$ generation increases due to the higher temperatures. In turbine engine design, balancing a reduction in $NO_x$ emissions, nvPM emissions, carbon monoxide (CO), and noise, while achieving improved engine performance, is difficult. For example, combustor design changes to achieve lower emissions must not impact the ability of the combustion system to satisfy performance and certification requirements throughout the operating cycle of the aircraft.

In addition to balancing a reduction in emissions while achieving improved engine performance, another tradeoff is reducing the specific fuel consumption (SFC) of the turbine engine. The specific fuel consumption is the amount of fuel consumed by the turbine engine for each unit of power output. Accordingly, a lower SFC means that less fuel is consumed to achieve a particular power output of the turbine engine. Some turbine engines utilize combustors in which the steam is injected through the fuel nozzle into the combustion chamber. Injecting steam into the combustion chamber reduces the SFC while also reducing $NO_x$ emissions. For example, the more steam that is injected into the combustor, the more the SFC will be reduced. Steam in the combustor, however, increases CO emissions and can lead to flameout as the steam chokes the flame (e.g., reduces oxygen in the combustion chamber). Further, such turbine engines that inject the steam from the fuel nozzle can achieve up to about 5% water-to-air ratios (WARs) within the combustor before flameout occurs. Thus, such turbine engines are limited in the amount of emissions and SFC reduction that can be achieved with the steam injection prior to flameout.

Accordingly, embodiments of the present disclosure provide systems and methods to balance the requirements in turbine engines of low fuel burn and low emissions (e.g., $NO_x$ emissions, nvPM emissions, CO, and noise) while balancing turbine engine performance, reduced SFC, and avoiding flameout in the combustor. Embodiments of the present disclosure provide for a turbine engine having a combustor with a trapped vortex cavity (TVC) that is in fluid communication with a main chamber of the combustor. Combustion mainly occurs in the TVC. In some embodiments, the fuel is injected only in the TVC and there is no fuel injected into the main chamber such that combustion does not occur in the main chamber. The turbine engine includes a steam system that generates steam from the exhaust of the turbine engine. The steam system injects the steam into the main chamber from the liners of the combustor, from the fuel nozzle tip, or from both the liners and the fuel nozzle tip. in some embodiments, the steam system injects the steam downstream of the TVC. Such a configuration of injecting the steam into the main chamber away from the TVC (e.g., downstream of the TVC) provides flame stability (e.g., reduces flameout risk) at various operating conditions (e.g., low-power, mid-power, and high-power) by injecting the steam away from the flame within the TVC.

The TVC enables a greater amount of steam to be injected into the combustor without sacrificing operability of the combustor, as compared to combustors without the benefit of the present disclosure. In one non-limiting example, the steam is injected into the main chamber away from the TVC to avoid operability issues and to avoid flameout as the steam is injected away from the flame within the TVC. Additionally or alternatively, the combustor includes a plurality of TVCs with the steam injected into the main chamber and downstream of the plurality of TVCs. Additionally, the steam can be injected between the plurality of TVCs. Additionally, or alternatively, the steam is mixed with air prior to being injected into the TVC. In configurations in which the steam is also injected into the TVC, a majority of the steam is injected into the main chamber while a lesser portion of the steam is injected into the TVC. Such a configuration of injecting a majority of the steam into the main chamber enables a greater amount of steam that can be injected into the combustor for reduced emissions and reduced SFC, while providing for flame stability (e.g., avoiding flameout), as compared to combustors without the benefit of the present disclosure. The present disclosure provides for WARs of up to 60%, thereby enabling a great amount of steam to reduce the emissions and to reduce the SFC, while providing for flame stability in the combustor (e.g., avoiding flameout).

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27, including a high pressure (HP) turbine 28, followed downstream by a low pressure (LP) turbine 30, and a jet exhaust nozzle section 32. A high pressure (HP) shaft 34 or a spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 or the fan section 14. As the volume of air 58 passes across the fan blades 40, a first portion of air 62 is directed or routed into the bypass airflow passage 56, and a second portion of air 64 is directed or is routed into the upstream section of the core air flow path, or, more specifically, into the annular inlet 20 of the LP compressor 22. The ratio between the first portion of air 62 and the second portion of air 64 is commonly known as a bypass ratio. The pressure of the second portion of air 64 is then increased, forming compressed air 65, and the compressed air 65 is routed through the HP compressor 24 and into the combustion section 26, where the compressed air 65 is mixed with fuel and burned to provide combustion gases 66.

The combustion gases 66 are routed into the HP turbine 28 and expanded through the HP turbine 28 where a portion of thermal energy or kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal energy or the kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

As detailed above, the second portion of air 64 is mixed with fuel 67 in the combustion section 26 to produce the combustion gases 66. The turbine engine 10 also includes a fuel system 80 for providing the fuel 67 to the combustion section 26. The fuel system 80 includes a fuel tank (not shown) for storing fuel therein and one or more fuel injector lines 82 to provide the fuel 67 to the combustion section 26, as detailed further below. The fuel system 80 can include one or more valves for controlling an amount of the fuel 67 provided to the combustion section 26. The fuel 67 can be any type of fuel used for turbine engines including liquid fuel or gaseous fuel. For example, the fuel 67 can be JetA, sustainable aviation fuels (SAF) including biofuels, hydrogen-based fuel ($H_2$), or the like.

The turbine engine 10 includes a steam system 90 in fluid communication with the jet exhaust nozzle section 32. The steam system 90 includes one or more steam lines 92 to provide steam 69 to the combustion section 26, as detailed further below. For example, the steam system 90 extracts the steam 69 from exhaust in the jet exhaust nozzle section 32. In some embodiments, the steam system 90 includes a water tank, or the like, and a heater for generating the steam 69 and for supplying the steam 69 to the combustion section 26.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2:
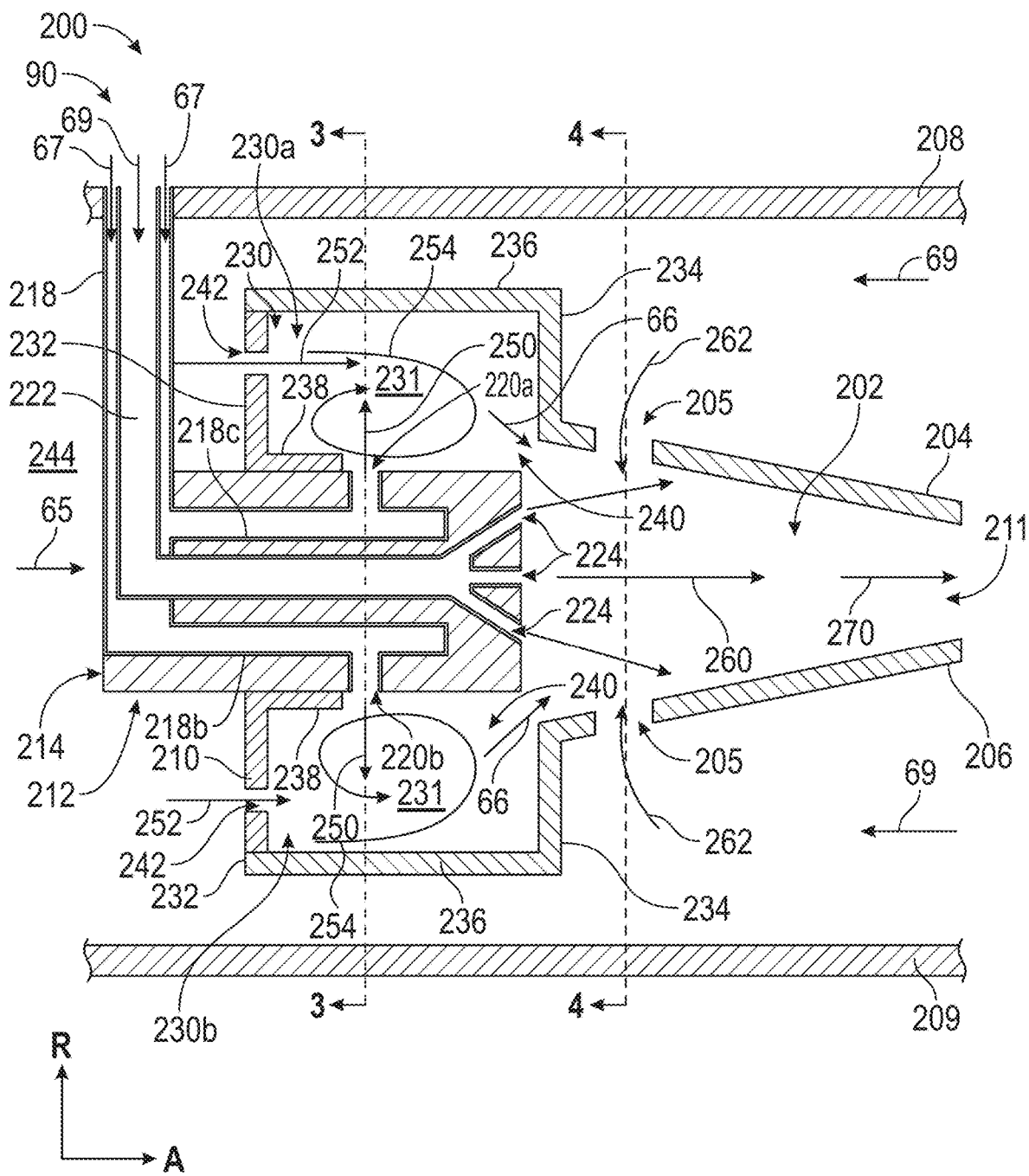
FIG. 2 is a schematic cross-sectional diagram of a combustor for the turbine engine of FIG. 1, taken along a longitudinal centerline axis of the turbine engine, according to the present disclosure.

FIG. 2 is a schematic cross-sectional diagram of a combustor 200 for the turbine engine 10 (FIG. 1), taken along the longitudinal centerline axis 12 (FIG. 1) of the turbine engine 10 (FIG. 1). In the exemplary embodiment, the combustion section 26 (FIG. 1) includes the combustor 200 having a main chamber 202 defined by an outer liner 204 and an inner liner 206. The combustor 200 is an annular combustor. The combustor 200, however, can include any type of combustor, such as, for example, annular combustors, double annular combustors, can-annular combustors, or the like.

The outer liner 204 and the inner liner 206 are annular about the longitudinal centerline axis 12 of the turbine engine 10 (FIG. 1). The outer liner 204 defines a radially outer boundary of the main chamber 202, and the inner liner 206 defines a radially inner boundary of the main chamber 202. The outer liner 204 and the inner liner 206 are spaced radially inward from an outer combustor casing 208 and an inner combustor casing 209, respectively, that extend circumferentially about the outer liner 204 and the inner liner 206. The outer liner 204 and the inner liner 206 include one or more liner steam holes 205 that operably direct the steam 69 through the outer liner 204 and through the inner liner 206, and into the main chamber 202, as detailed further below. The combustor 200 also includes an annular dome 210 mounted upstream from the outer liner 204 and the inner liner 206. The annular dome 210 defines an upstream end of the main chamber 202. The main chamber 202 extends to a combustor outlet 211.

A plurality of mixing assemblies 212 (only one is illustrated in FIG. 2) is spaced circumferentially about the annular dome 210. In FIG. 2, the mixing assembly 212 is illustrated as including a main mixer 214. A plurality of fuel injectors 218 (only one is illustrated in FIG. 2) is coupled in flow communication the plurality of mixing assemblies 212. The plurality of fuel injectors 218 is spaced circumferentially about the annular dome 210 and extend radially from the outer combustor casing 208 to the plurality of mixing assemblies 212. In some embodiments, the plurality of fuel injectors 218 extends from the inner combustor casing 209, or can extend from both the outer combustor casing 208 and the inner combustor casing 209. The plurality of fuel injectors 218 includes a first fuel injector 218a and a second fuel injector 218b. The first fuel injector 218a includes one or more first fuel injection holes 220a for injecting the fuel 67 radially outward, as detailed further below. The second fuel injector 218b includes one or more second fuel injection holes 220b for injecting the fuel 67 radially inward, as detailed further below.

One or more steam injectors 222 are coupled in flow communication with the plurality of mixing assemblies 212. The one or more steam injectors 222 are spaced circumferentially about the annular dome 210 and extend radially from the outer combustor casing 208 to the plurality of mixing assemblies 212. In some embodiments, the one or more steam injectors 222 extend from the inner combustor casing 209. Each of the one or more steam injectors 222 includes one or more steam injection holes 224 for injecting the steam 69 axially aftward or generally radially into the main chamber 202. For example, the steam system 90 (FIG. 1) supplies the steam 69 to the one or more steam injectors 222 through the one or more steam lines 92 (FIG. 1), and the one or more steam injectors 222 inject the steam 69 therethrough, as detailed further below. The one or more steam injection holes 224 include one or more discrete holes, some of which are spaced circumferentially about the one or more steam injectors 222.

The combustor 200 includes a plurality of trapped vortex cavities (TVCs) 230 that each defines a combustion zone 231. The plurality of TVCs 230 includes a first TVC 230a that extends from the outer liner 204 and a second TVC 230b that extends from the inner liner 206. Each of the plurality of TVCs 230 is a cavity and is utilized to produce trapped vortices of a fuel-air mixture, as detailed further below. For example, the plurality of fuel injectors 218 is positioned to inject the fuel 67 radially into each of the plurality of TVCs 230, as detailed further below. Each of the plurality of TVCs 230 is positioned radially outward of the main chamber 202.

Each of the plurality of TVCs 230 is defined by one or more walls 232, 234, 236, 238 (collectively referred to as the walls of the respect one of the plurality of TVCs 230). For example, each of the plurality of TVCs 230 is defined by a first wall 232, a second wall 234, a third wall 236, and a fourth wall 238. The first wall 232 and the second wall 234 extend generally radially, and the third wall 236 and the fourth wall 238 extend generally axially. The annular dome 210 defines at least a portion of the first wall 232 and the fourth wall 238. The first wall 232 defines a forward wall of the TVC 230, the second wall 234 defines an aft wall of the TVC 230, the third wall 236 defines a first axial wall of the TVC 230, and the fourth wall 238 defines a second axial wall of the TVC 230. The second wall 234 is spaced axially aft of the first wall 232. The first wall 232 extends generally radially from a forward end of the third wall 236 to a forward end of the fourth wall 238. The second wall 234 extends generally radially from the outer liner 204 to an aft end of the third wall 236. The third wall 236 is spaced radially outward from the fourth wall 238. The third wall 236 extends generally axially from a radially outer end of the first wall 232 to a radially outer end the second wall 234.

The main mixer 214 extends through the annular dome 210 to separate the first TVC 230a and the second TVC 230b. In this way, the main mixer 214 is disposed between the fourth wall 238 of the first TVC 230a and the fourth wall 238 of the second TVC 230b. The fourth wall 238 of each TVC 230 extends generally axially from a radially inner end of the first wall 232 to a location axially forward of the one or more first fuel injection holes 220a and the one or more second fuel injection holes 220b. Each of the plurality of TVCs 230 also includes a TVC opening 240 defined between the second wall 234 and the main mixer 214.

Each of the plurality of TVCs 230 is defined between the first wall 232, the second wall 234, the third wall 236, and the fourth wall 238. In this way, each of the plurality of TVCs 230 is located generally radially outward from, and axially forward (e.g., upstream) of, the main chamber 202. The outer liner 204 and the inner liner 206 extend axially aftward from the plurality of TVCs 230 and the main chamber 202 is defined downstream of the plurality of TVCs 230. The outer liner 204 and the inner liner 206 are angled inward towards each other to define a converging nozzle to accelerate the combustion gases 66 therethrough to the combustor outlet 211. The one or more liner steam holes 205 are positioned on the outer liner 204 and the inner liner 206 axially aft of the plurality of TVCs 230 to inject the steam 69 downstream of the plurality of TVCs 230, as detailed further below. The TVC opening 240 is an opening in the outer liner 204 or the inner liner 206 to provide flow communication from each TVC 230 to the main chamber 202. While the plurality of TVCs 230 illustrated in FIG. 2 includes a substantially rectangular cross section, the plurality of TVCs 230 can include any shape.

Each of the plurality of TVCs 230 includes one or more TVC air holes 242 defined through at least one of the one or more walls 232, 234, 236, 238. By way of non-limiting example, the one or more TVC air holes 242 are defined through the first wall 232 or the annular dome 210. A size of each of the one or more TVC air holes 242, a number of the one or more TVC air holes 242, and the circumferential spacing between respective ones of the one or more TVC air holes 242 is based on an amount of airflow desired to generate a vortex 254 within each of the plurality of TVCs 230, as detailed further below. In addition, the one or more TVC air holes 242 are generally circular openings, but can include any other shape, such as, for example, oval-shaped slots, or the like. The combustor 200 also includes a diffuser section 244 defined between the outer combustor casing 208 and the inner combustor casing 209 and upstream of the main chamber 202 and the plurality of TVCs 230 (e.g., upstream of the annular dome 210).

In operation, the plurality of fuel injectors 218 injects the fuel 67 radially into each of the plurality of TVCs 230 to generate a fuel stream 250 within each of the plurality of TVCs 230. For example, the first fuel injector 218a injects the fuel 67 radially into the first TVC 230a and the second fuel injector 218b injects the fuel 67 radially into the second TVC 230b. At the same time, the combustor 200 receives the compressed air 65 that is discharged from the HP compressor 24 (FIG. 1) in the diffuser section 244. A portion of the compressed air 65 is channeled through the one or more TVC air holes 242 to generate a compressed air stream 252. For example, the one or more TVC air holes 242 operably direct the compressed air 65 axially aftward into each of the plurality of TVCs 230 (e.g., into the first TVC 230a and the second TVC 230b) through the first wall 232 and generate the vortex 254 within each of the plurality of TVCs 230.

In each of the plurality of TVCs 230, the compressed air stream 252 is mixed with the fuel stream 250 from each fuel injector 218. For example, the fuel stream 250 is injected substantially perpendicular to the compressed air stream 252. Such a configuration is known as jet-in-crossflow fuel injection. The vortex 254 and the jet-in-crossflow fuel injection of the fuel stream 250 facilitates mixing of the fuel stream 250 and the compressed air stream 252 to generate a fuel-air mixture. The fuel-air mixture is ignited by an igniter (not shown in FIG. 2 for clarity) for generating a flame within each of the plurality of TVCs 230 that burns the fuel-air mixture and provides combustion gases 66 that are channeled downstream through the TVC opening 240. The vortex 254 traps the flame within each of the plurality of TVCs 230 such that the fuel-air mixture combusts entirely within each of the plurality of TVCs 230 and produces the combustion gases 66 within each of the plurality of TVCs 230.

The plurality of TVCs 230 operably directs the combustion gases 66 through the TVC opening 240 and into the main chamber 202. The one or more steam injectors 222 inject the steam 69 through the one or more steam injection holes 224 to generate a first steam stream 260. For example, the one or more steam injectors 222 inject the steam 69 axially aftward into the main chamber 202 and downstream of the plurality of TVCs 230. The one or more liner steam holes 205 operably direct a portion of the compressed air 65 and the steam 69 from the steam system 90 (FIG. 1), through the outer liner 204 and the inner liner 206, and into the main chamber 202, thereby generating a second steam stream 262 in the main chamber 202 downstream of the plurality of TVCs 230. In some embodiments, the combustor 200 includes a steam swirler at the steam injector 222 or at the one or more liner steam holes 205 to swirl the first steam stream 260 or the second steam stream 262, respectively.

At the main chamber 202, the combustion gases 66 mix with the first steam stream 260 and the second steam stream 262 to generate a steam-combustion gases mixture 270. In some embodiments, the one or more liner steam holes 205 are angled tangentially on the outer liner 204 or the inner liner 206 such that the second steam stream 262 is generated at an angle other than ninety degrees (90°) to improve mixing of the second steam stream 262 with the combustion gases 66. The main chamber 202 then operably directs the steam-combustion gases mixture 270 to exit the main chamber 202 through the combustor outlet 211, and the steam-combustion gases mixture 270 is channeled downstream to the first stage turbine nozzle of the HP turbine 28 (FIG. 1).

The steam system 90 can vary the steam injection into the main chamber 202 during various operating conditions of a mission cycle of the turbine engine 10 (FIG. 1). The mission cycle includes, for example, a low-power operation, a mid-level power operation, and a high-power operation. The low-power operation includes, for example, engine start, idle, taxiing, and approach. The mid-level power operation includes, for example, cruise. The high-power operation includes, for example, takeoff and climb. During engine start conditions or idle conditions, the steam system 90 does not inject the steam 69 into the main chamber 202. During operating conditions that are above idle conditions (e.g., taxiing and approach), during the mid-power operation, and during the high-power operation, the steam system 90 operably injects the steam 69. During the high-power operation, the steam system 90 operably injects a greater amount of the steam 69 than during the mid-power operation.

The plurality of TVCs 230 provides for an upstream chamber for combustion while the steam system 90 injects the steam 69 into the main chamber 202. Such a configuration enables a water-to-air ratio (WAR) up to 60% of the steam 69 to the compressed air 65 within the main chamber 202. For example, the WAR is 0.0% to 60%, and is preferably 5% to 60%. In some embodiments, the WAR is 0.0% to 60% based on the operating conditions of the turbine engine (e.g., startup, idle, taxi, takeoff, climb, cruise, descent) or of the combustor 200. For example, the WAR in the main chamber 202 is zero percent to thirty percent (0% to 30%) during low-power conditions, is one percent to forty percent (1% to 40%) during mid-power conditions, and is two percent to sixty percent (2% to 60%) during high-power conditions. In this way, the steam 69 is injected into the main chamber 202 during any operating condition of the turbine engine 10 (FIG. 1) or of the combustor 200 that is above an idle condition. Accordingly, the steam 69 injected into the main chamber 202 enables reduced emissions (NOx emissions, nvPM emissions, CO emissions, noise) and reduced specific fuel capacity (SFC) while avoiding flameout of the flame within the plurality of TVCs 230 due to the steam 69 being injected into the main chamber 202 away from the flame within each of the plurality of TVCs 230, as compared to turbine engines without the benefit of the present disclosure.

Figure 3:
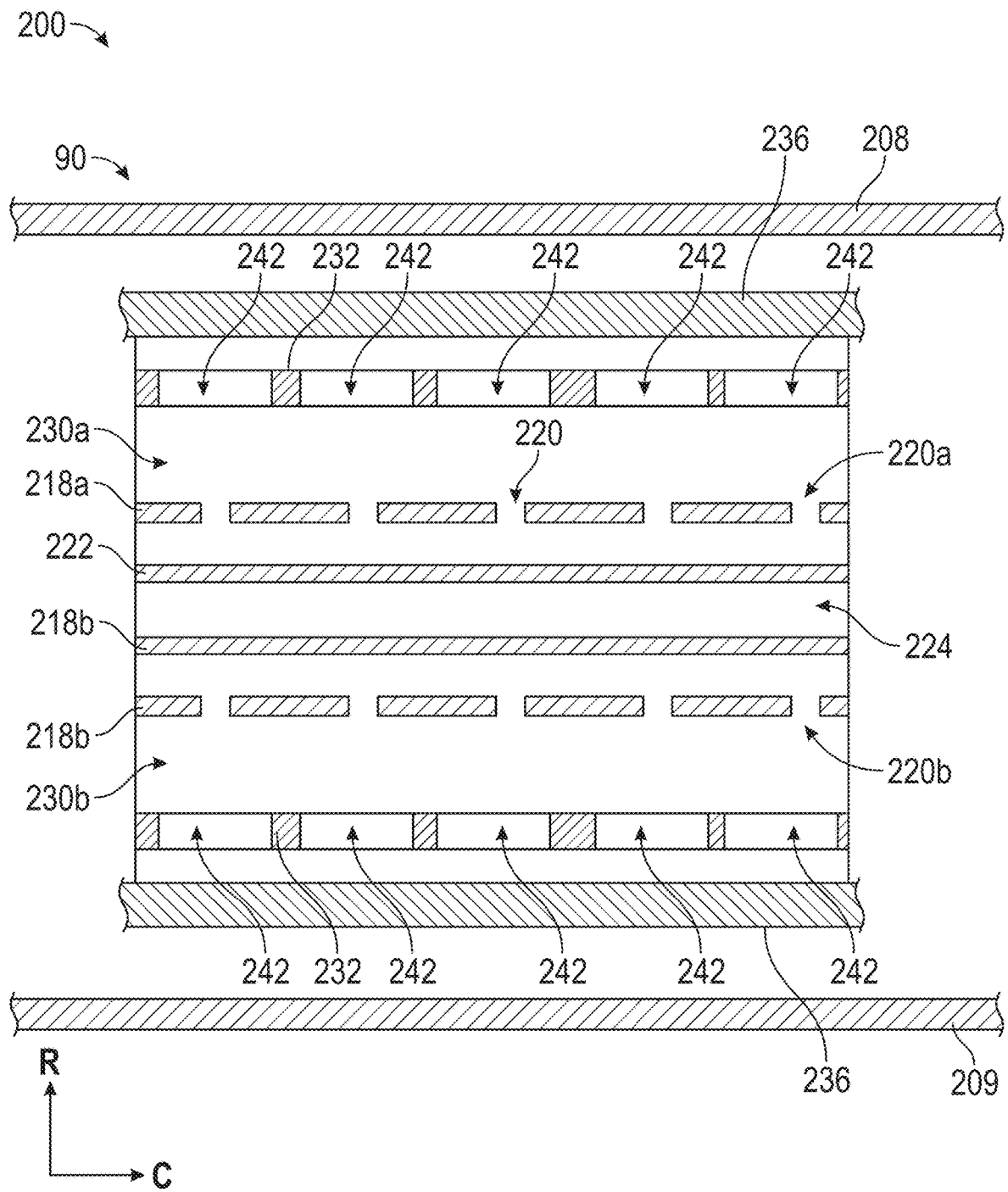
FIG. 3 is schematic cross-sectional diagram of the combustor of FIG. 2, taken at cross section 3-3 in FIG. 2, according to the present disclosure.

FIG. 3 is a schematic cross-sectional diagram of the combustor 200, taken at cross section 3-3 in FIG. 2, according to the present disclosure. FIG. 3 shows that the first TVC 230a and the second TVC 230b are annular about the longitudinal centerline axis 12 (FIG. 1) of the turbine engine 10 (FIG. 1). The one or more TVC air holes 242 include a plurality of discrete air holes disposed through the first wall 232. Further, the first fuel injector 218a and the second fuel injector 218b are annular about the longitudinal centerline axis 12 (FIG. 1) of the turbine engine 10 (FIG. 1). The one or more first fuel injection holes 220a and the one or more second fuel injection holes 220b each includes a plurality of discrete fuel injection holes that are spaced circumferentially about the first fuel injector 218a and the second fuel injector 218b, respectively. The one or more steam injectors 222 include an annular steam injector that is annular about the longitudinal centerline axis 12 (FIG. 1) of the turbine engine 10 (FIG. 1). The one or more steam injectors 222 include a single steam injection passage that is annular about the longitudinal centerline axis 12 (FIG. 1) of the turbine engine 10 (FIG. 1). The one or more steam injectors 222, however, can include one or more steam injection holes 224 to inject the steam 69 into the main chamber 202.

In some embodiments, both a portion of the steam 69 and the fuel 67 are injected into the plurality of TVCs 230. For example, the one or more fuel injection holes 220 and the one or more steam injection holes 224 alternate circumferentially about the first fuel injector 218a and the second fuel injector 218b such that the portion of the steam 69 and the fuel 67 are injected radially into the first TVC 230a and the second TVC 230b. In some embodiments, the one or more fuel injection holes 220 and the one or more steam injection holes 224 are positioned circumferentially about the first fuel injector 218a and the second fuel injector 218b such that a plurality of fuel injection holes 220 and a plurality of steam injection holes 224 alternate.

Figure 4:
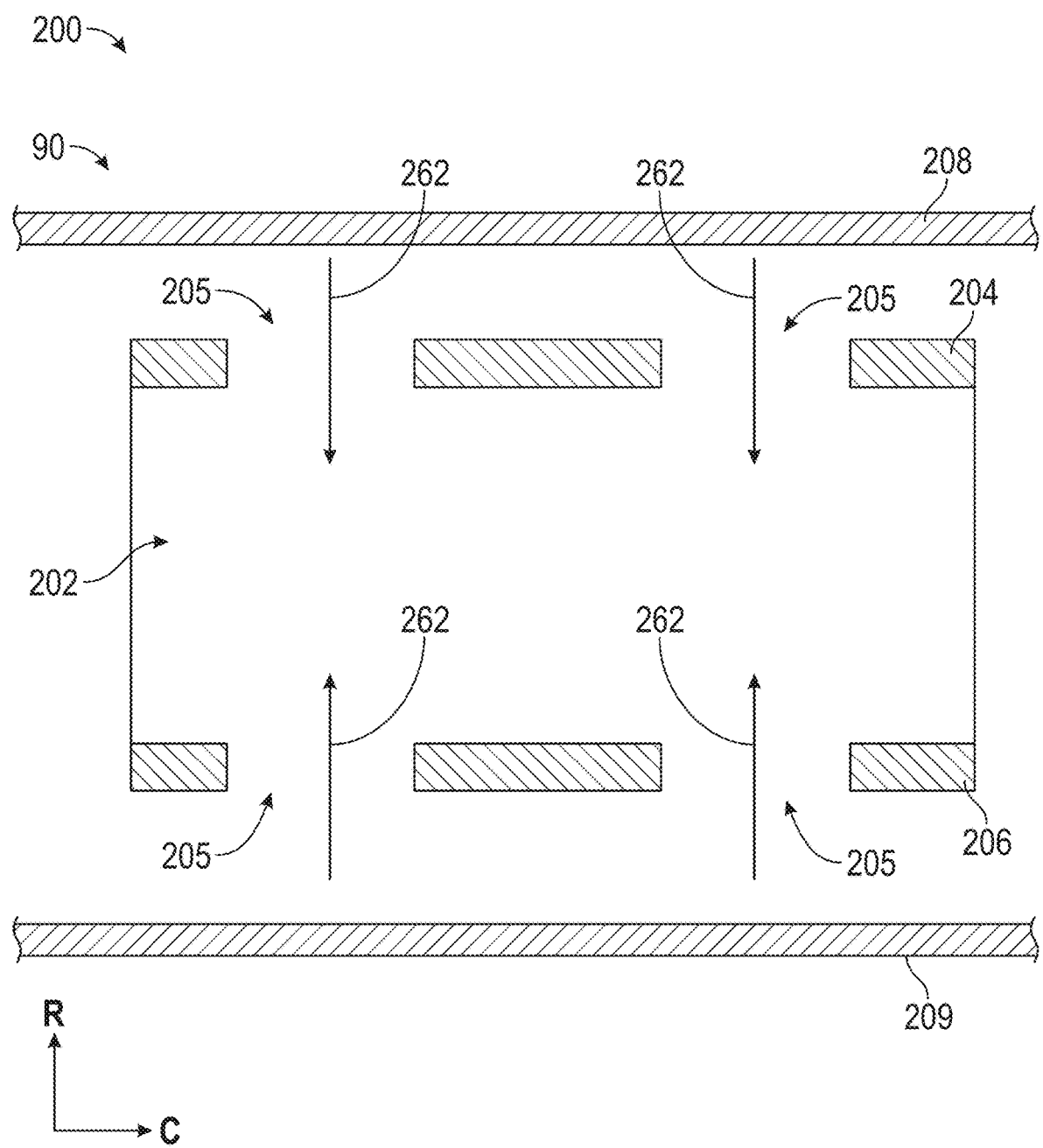
FIG. 4 is schematic cross-sectional diagram of the combustor, taken at cross section 4-4 in FIG. 2, according to the present disclosure.

FIG. 4 is a schematic cross-sectional diagram of the combustor 200, taken at cross section 4-4 in FIG. 2, according to the present disclosure. FIG. 4 shows that the one or more liner steam holes 205 include a plurality of discrete liner steam holes that is spaced circumferentially about the outer liner 204 and the inner liner 206. In this way, the one or more liner steam holes 205 operably direct the second steam stream 262 through the outer liner 204 and the inner liner 206 and into the main chamber 202.

Figure 5:
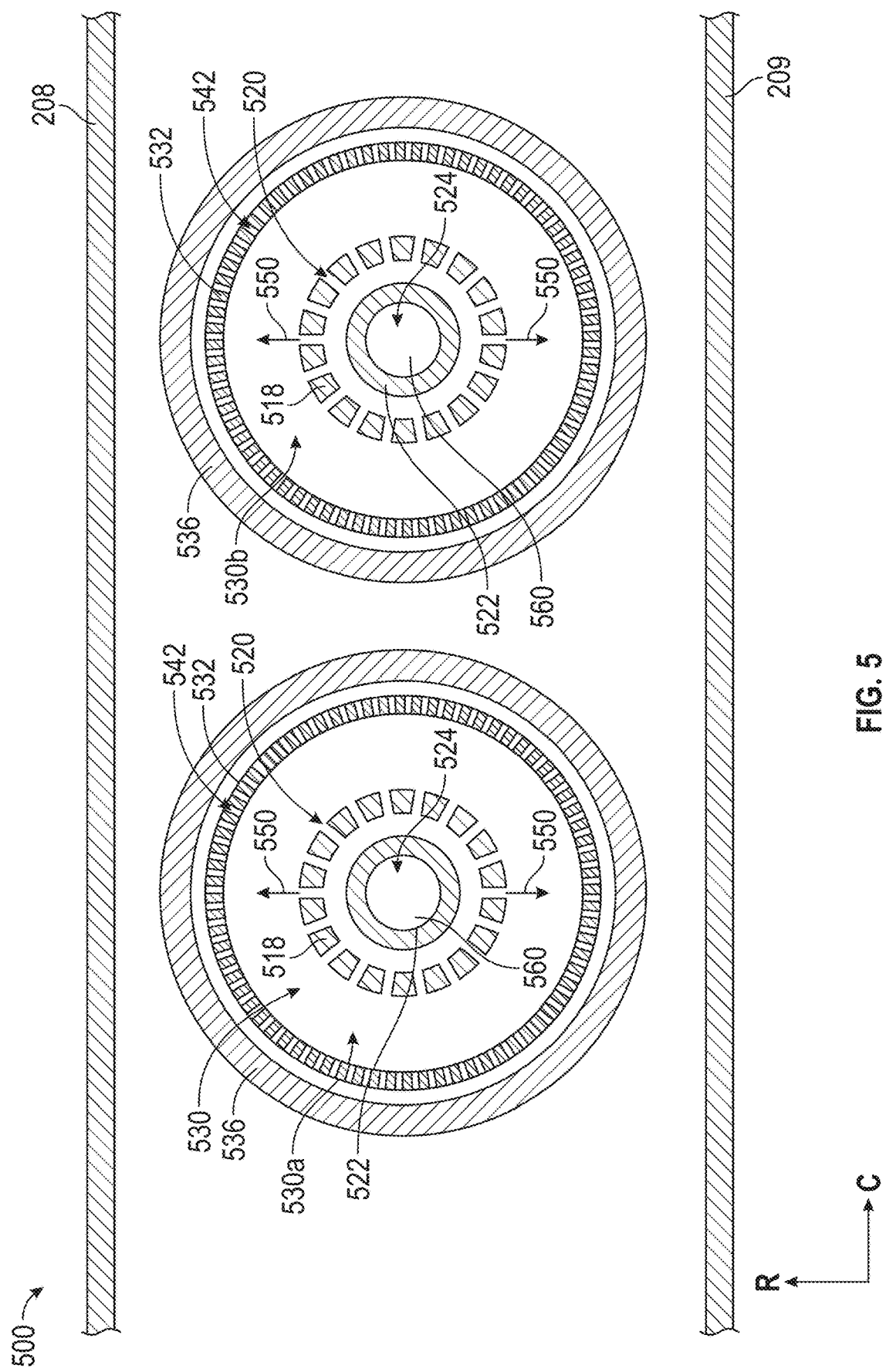
FIG. 5 is a schematic cross-sectional diagram of a combustor, taken at a latitudinal centerline axis of the combustor, according to the present disclosure.

FIG. 5 is a schematic cross-sectional diagram of a combustor 500, taken at a latitudinal centerline axis of the combustor 500, according to the present disclosure. The combustor 500 is substantially similar the combustor 200 of FIG. 2. FIG. 5 shows the combustor 500 includes a plurality of fuel injectors 518 each having a plurality of fuel injection holes 520, a plurality of steam injectors 522 each having one or more steam injection holes 524, and a plurality of TVCs 530. Each TVC 530 is a discrete TVC that is annular about a respective steam injector 522, and the plurality of TVCs 530 is spaced circumferentially about the combustor 500. For example, the plurality of TVCs 530 include a first TVC 530a and a second TVC 530b. Each TVC 530 includes one or more walls 532, 536 (collectively referred to as the walls of each TVC 530). In particular, each TVC 530 is defined by a first wall 532, a second wall (not shown in the view of FIG. 5), and a third wall 536. The walls of each TVC 530 include a generally circular cross section such that that each TVC 530 includes a generally circular cross section (e.g., each TVC 530 is cylindrical).

Each TVC 530 has a respective fuel injector 518 and a respective steam injector 522 associated therewith. Each TVC 530 includes a plurality of TVC air holes 542 disposed through the first wall 532. The respective fuel injector 518 is cylindrical with the plurality of fuel injection holes 520 being disposed circumferentially about the respective fuel injector 518. The respective fuel injector 518 of each TVC 530 injects the fuel through the plurality of fuel injection holes 520 radially outward to generate a fuel stream 550. The respective steam injector 522 is cylindrical with the one or more steam injection holes 524 being disposed axially through the respective steam injector 522. The respective steam injector 522 injects the steam axially aftward to generate a steam stream 560. In some embodiments, the one or more steam injection holes 524 include one or more steam injection holes 524 positioned to inject the steam 69 radially into the first TVC 530a and the second TVC 530b.

Each TVC 530 is cylindrical about the fuel injector 518 and the steam injector 522. The combustor 500 includes an outer liner and an inner liner (not shown in the view of FIG. 5) that extend generally axially from the plurality of TVCs 530 similar to the outer liner 204 and the inner liner 206 of FIG. 2. For example, the outer liner and the inner liner in the embodiment of FIG. 5 are annular about a longitudinal centerline axis of the combustor 500.

Figure 6:
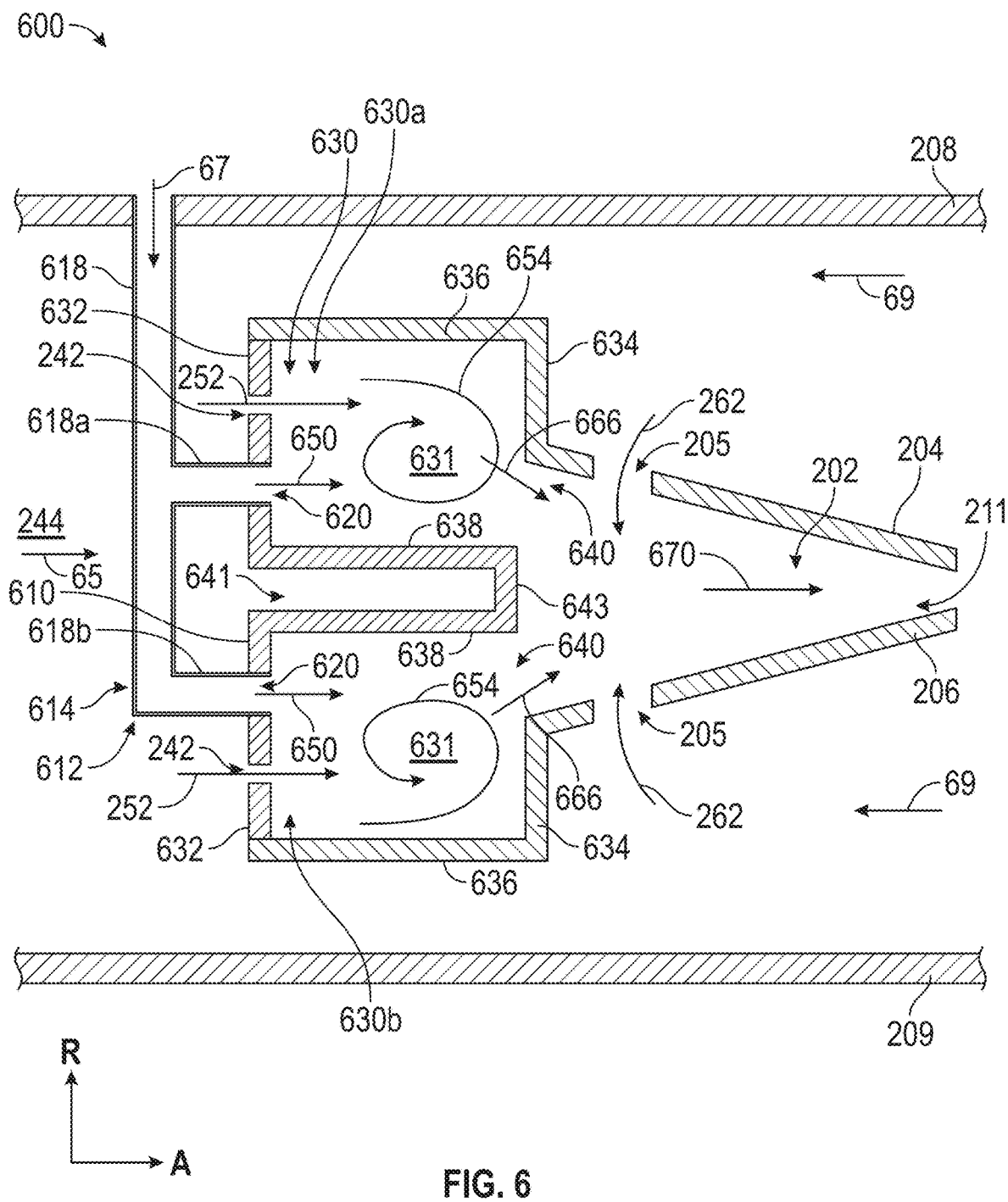
FIG. 6 is a schematic cross-sectional diagram of a combustor for a turbine engine, taken along a longitudinal centerline axis of the turbine engine, according to another embodiment.

FIG. 6 is a schematic cross-sectional diagram of a combustor 600 for a turbine engine, taken along a longitudinal centerline axis of the turbine engine, according to another embodiment. The combustor 600 is substantially similar to the combustor 200 of FIG. 2. The same reference numerals will be used for components of the combustor 200 that are the same as or similar to the components of the combustor 200 discussed above. The description of these components above also applies to this embodiment, and a detailed description of these components is omitted here. The combustor 600 includes an annular dome 610, a plurality of mixing assemblies 612 and a plurality of TVCs 630 that are different than the annular dome 210, the plurality of mixing assemblies 212, and the plurality of TVCs 230 of FIG. 2, respectively. The combustor 600 does not include a steam injector similar to the steam injector 222 of FIG. 2.

Each of the plurality of mixing assemblies 612 includes a main mixer 614 and a plurality of fuel injectors 618. The plurality of fuel injectors 618 includes a first fuel injector 618a and a second fuel injector 618b. The first fuel injector 618a and the second fuel injector 618b extend axially, as detailed further below. Each of the plurality of fuel injectors 618 includes one or more fuel injection holes 620 for injecting the fuel 67 therethrough.

Each of the plurality of TVCs 630 defines a combustion zone 631. The plurality of TVCs 630 includes a first TVC 630a and a second TVC 630b. Each of the plurality of TVCs 630 is defined by one or more walls 632, 634, 636, 638 (collectively referred to as the walls of the TVC 630). In particular, each of the plurality of TVCs 630 is defined by a first wall 632, a second wall 634, a third wall 636, and a fourth wall 638. The walls of each of the plurality of TVCs 630 are substantially similar to the walls of each of the plurality of TVCs 230 of FIG. 2. The fourth wall 638, however, extends axially from the first wall 632 to a TVC opening 640 that is defined between the fourth wall 638 and the outer liner 204 or the inner liner 206. The fourth wall 638 of each of the first TVC 630a and the second TVC 630b are spaced from each other such that a radial gap 641 is defined between the fourth wall 638 of the first TVC 630a and the fourth wall 638 of the second TVC 630b. The fourth wall 638 of the first TVC 630a and the fourth wall 638 of the second TVC 630b are coupled at an axially aft end by a liner extension portion 643 that extends from the axially aft end of the fourth wall 638 the first TVC 630a to the axially aft end of the fourth wall 638 of the second TVC 630b. The first fuel injector 618a is disposed through the first wall 632 of the first TVC 630a, and the second fuel injector 618b is disposed through the first wall 632 of the second TVC 630b.

The combustor 600 operates substantially similar as to the combustor 200 of FIG. 2. The plurality of fuel injectors 618 injects the fuel 67 through the one or more fuel injection holes 620 and into each respective TVC 630 to generate a fuel stream 650 within each of the plurality of TVCs 630. The fuel stream 650 mixes with the compressed air stream 252 by a vortex 654 to generate the fuel-air mixture. The fuel-air mixture is ignited and generates combustion gases 666 within each of the plurality of TVCs 630. Each of the plurality of TVCs 630 operably directs the combustion gases 666 through the TVC opening 640 and into the main chamber 202. At the main chamber 202, the combustion gases 666 mix with the second steam stream 262 to generate a steam-combustion gases mixture 670 that is channeled downstream to the first stage turbine nozzle of the HP turbine (e.g., the HP turbine 28 of FIG. 1).

Figure 7:
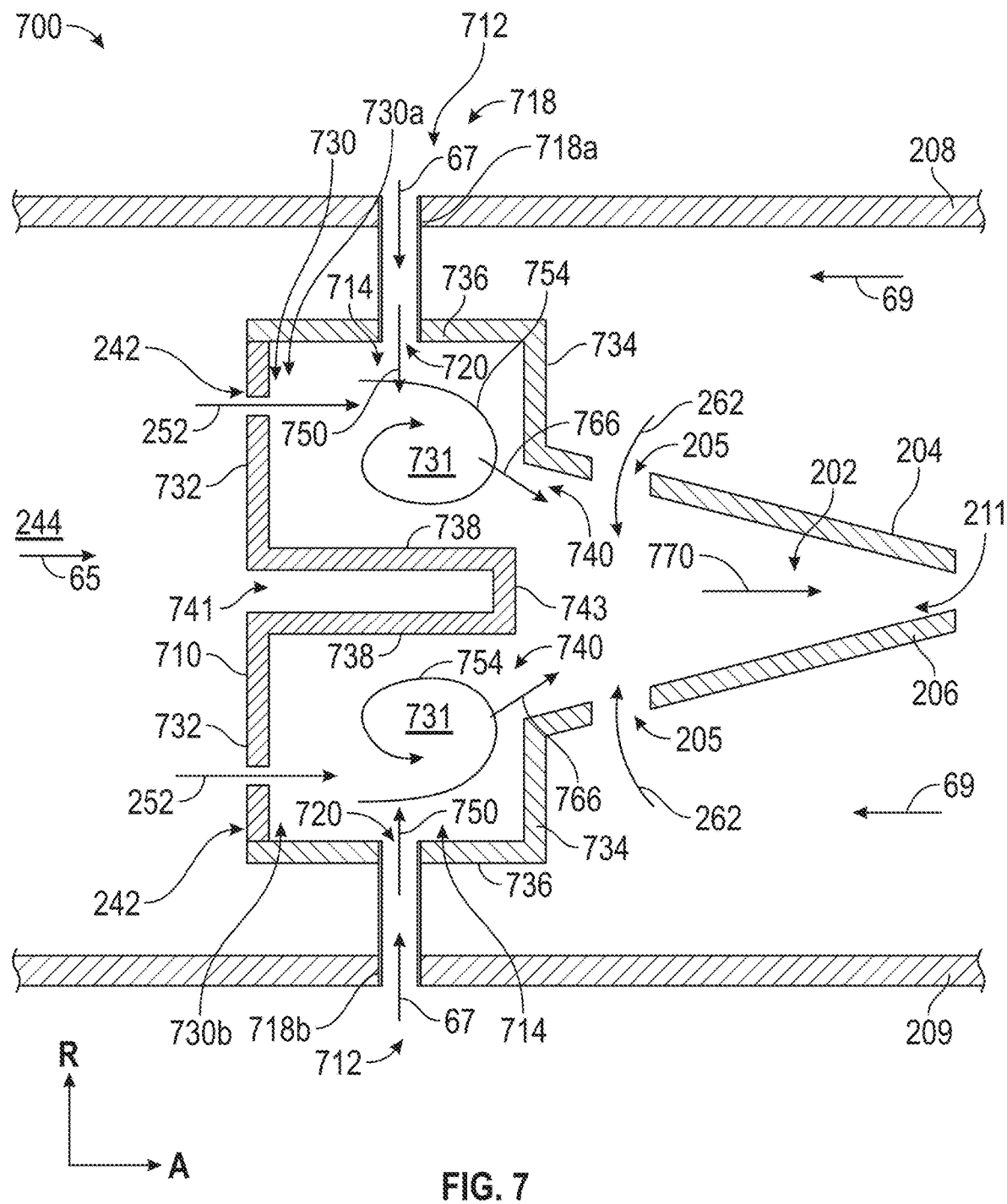
FIG. 7 is a schematic cross-sectional diagram of a combustor for a turbine engine, taken along a longitudinal centerline axis of the turbine engine, according to another embodiment.

FIG. 7 is a schematic cross-sectional diagram of a combustor 700 for a turbine engine, taken along a longitudinal centerline axis of the turbine engine, according to another embodiment. The combustor 700 is substantially similar to the combustor 200 of FIG. 2. The same reference numerals will be used for components of the combustor 700 that are the same as or similar to the components of the combustor 200 discussed above. The description of these components above also applies to this embodiment, and a detailed description of these components is omitted here. The combustor 700 includes an annular dome 710, a plurality of mixing assemblies 712, and a plurality of TVCs 730 that are different than the annular dome 210, the plurality of mixing assemblies 212, and the plurality of TVCs 230 of FIG. 2, respectively. The combustor 700 does not include a steam injector such as a steam injector 222 shown in FIG. 2.

Each of the plurality of mixing assemblies 712 includes a main mixer 714 and a plurality of fuel injectors 718. The plurality of fuel injectors 718 includes a first fuel injector 718a and a second fuel injector 718b. The first fuel injector 718a and the second fuel injector 718b extend radially, as detailed further below. Each of the plurality of fuel injectors 718 includes one or more fuel injection holes 720 for injecting the fuel 67 therethrough.

Each of the plurality of TVCs 730 defines a combustion zone 731. The plurality of TVCs 730 includes a first TVC 730a and a second TVC 730b. Each of the plurality of TVCs 730 is defined by one or more walls 732, 734, 736, 738 (collectively referred to as the walls of the TVC 730). In particular, each TVC 730 is defined by a first wall 732, a second wall 734, a third wall 736, and a fourth wall 738. The walls of each of the plurality of TVCs 730 are substantially similar to the walls of each of the plurality of TVCs 630 of FIG. 6. For example, the fourth wall 738 extends axially from the first wall 732 to a TVC opening 740 that is defined between the fourth wall 738 and the outer liner 204 or the inner liner 206. The fourth wall 738 of each of the first TVC 730a and the second TVC 730b is spaced from each other such that a radial gap 741 is defined between the fourth wall 738 of the first TVC 730a and the fourth wall 738 of the second TVC 730b. The fourth wall 738 of the first TVC 730a and the fourth wall 738 of the second TVC 730b are coupled at an axially aft end by a liner extension portion 743 that extends from the axially aft end of the fourth wall 738 of the first TVC 730a to the axially aft end of the fourth wall 738 of the second TVC 730b. The first fuel injector 718a is disposed through the third wall 736 of the first TVC 730a such that the first fuel injector 718a injects the fuel 67 radially into the first TVC 730a. The second fuel injector 718b is disposed through the third wall 736 of the second TVC 730b such that the second fuel injector 718b injects the fuel 67 radially into the second TVC 730b.

The combustor 700 operates substantially similar as to the combustor 200 of FIG. 2. The plurality of fuel injectors 718 injects the fuel 67 through the one or more fuel injection holes 720 radially into each respective TVC 730 to generate a fuel stream 750 within each of the plurality of TVCs 730. The fuel stream 750 mixes with the compressed air stream 252 by a vortex 754 to generate the fuel-air mixture. The fuel-air mixture is ignited and generates combustion gases 766 within each of the plurality of TVCs 730. Each of the plurality of TVCs 730 operably directs the combustion gases 766 through the TVC opening 740 and into the main chamber 202. At the main chamber 202, the combustion gases 766 mix with the second steam stream 262 to generate a steam-combustion gases mixture 770 that is channeled downstream to the first stage turbine nozzle of the HP turbine (e.g., the HP turbine 28 of FIG. 1).

Figure 8:
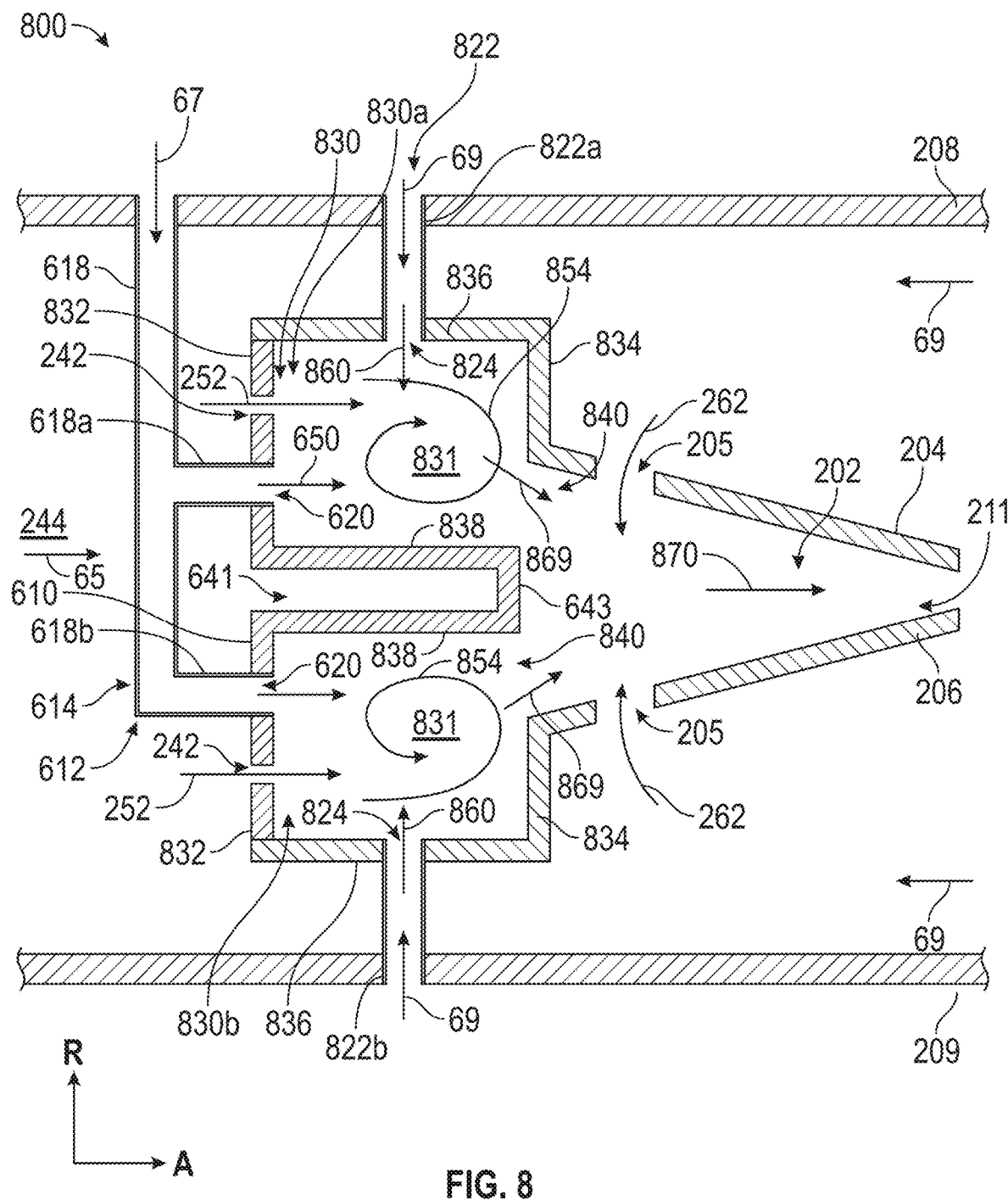
FIG. 8 is a schematic cross-sectional diagram of a combustor for a turbine engine, taken along a longitudinal centerline axis of the turbine engine, according to another embodiment.

FIG. 8 is a schematic cross-sectional diagram of a combustor 800 for a turbine engine, taken along a longitudinal centerline axis of the turbine engine, according to another embodiment. The combustor 800 is substantially similar to the combustors 200, 600 of FIGS. 2 and 6, respectively. The same reference numerals will be used for components of the combustor 800 that are the same as or similar to the components of the combustors 200, 600 discussed above. The description of these components above also applies to this embodiment, and a detailed description of these components is omitted here. The combustor 800 has a plurality of TVCs 830 that is different than the plurality of TVCs 630 of FIG. 6.

Each of the plurality of TVCs 830 defines a combustion zone 831. The plurality of TVCs 830 includes a first TVC 830a and a second TVC 830b. Each of the plurality of TVCs 830 is defined by one or more walls 832, 834, 836, 838 (collectively referred to as the walls of the TVC 830). In particular, each of the plurality of TVCs 830 is defined by a first wall 832, a second wall 834, a third wall 836, and a fourth wall 838. The walls of each of the plurality of TVCs 830 are substantially similar to the walls of each of the plurality of TVCs 630 of FIG. 6. The first fuel injector 618a is disposed through the first wall 832 of the first TVC 830a such that the first fuel injector 618a injects the fuel 67 axially aftward into the first TVC 830a. The second fuel injector 618b is disposed through the first wall 832 of the second TVC 830b such that the second fuel injector 618b injects the fuel 67 axially aftward into the second TVC 830b.

A steam system (e.g., the steam system 90 of FIG. 1) also includes a plurality of steam injectors 822 disposed through the third wall 836 of each of the plurality of TVCs 830. For example, the plurality of steam injectors 822 includes a first steam injector 822a disposed through the third wall 836 of the first TVC 830a, and a second steam injector 822b disposed through the third wall 836 of the second TVC 830b. Each steam injector 822 includes one or more steam injection holes 824 such that each steam injector 822 injects the steam 69 radially into the respective TVC 830, as detailed further below.

The combustor 800 operates substantially similar as to the combustor 600 of FIG. 6. The plurality of steam injectors 822 injects the steam 69 radially into each respective TVC 830 through the one or more steam injection holes 824 to generate a first steam stream 860. The first steam stream 860 includes steam and air. The plurality of fuel injectors 618 injects the fuel 67 through the one or more fuel injection holes 620 and into each respective TVC 830 to generate the fuel stream 650 within each of the plurality of TVCs 830. The fuel stream 650 mixes with the compressed air stream 252 and with the first steam stream 860 by a vortex 854 to generate a fuel-air-steam mixture. The fuel-air-steam mixture is ignited and generates a first steam-combustion gases mixture 869 within each of the plurality of TVCs 830. Each of the plurality of TVCs 830 operably directs the first steam-combustion gases mixture 869 through the TVC opening 840 and into the main chamber 202. At the main chamber 202, the first steam-combustion gases mixture 869 mixes with the second steam stream 262 to generate a second steam-combustion gases mixture 870 that is channeled downstream to the first stage turbine nozzle of the HP turbine (e.g., the HP turbine 28 of FIG. 1).

The first steam stream 860 in each respective TVC 830 includes a WAR of up to 30% (e.g., in a range of 0.0% to 30%), and the second steam stream 262 in the main chamber 202 includes a WAR of up to 60% (e.g., in a range of 0.0% to 60%. In this way, more of the steam 69 is injected into the main chamber 202 compared to the steam 69 injected into the plurality of TVCs 830. Such a configuration provides for flame stability in the plurality of TVCs 830, while providing for reduced emissions and reduced SFC. In some embodiments, the steam 69 is injected into the plurality of TVCs 830 and no steam is injected through the one or more liner steam holes 205.

Figure 9:
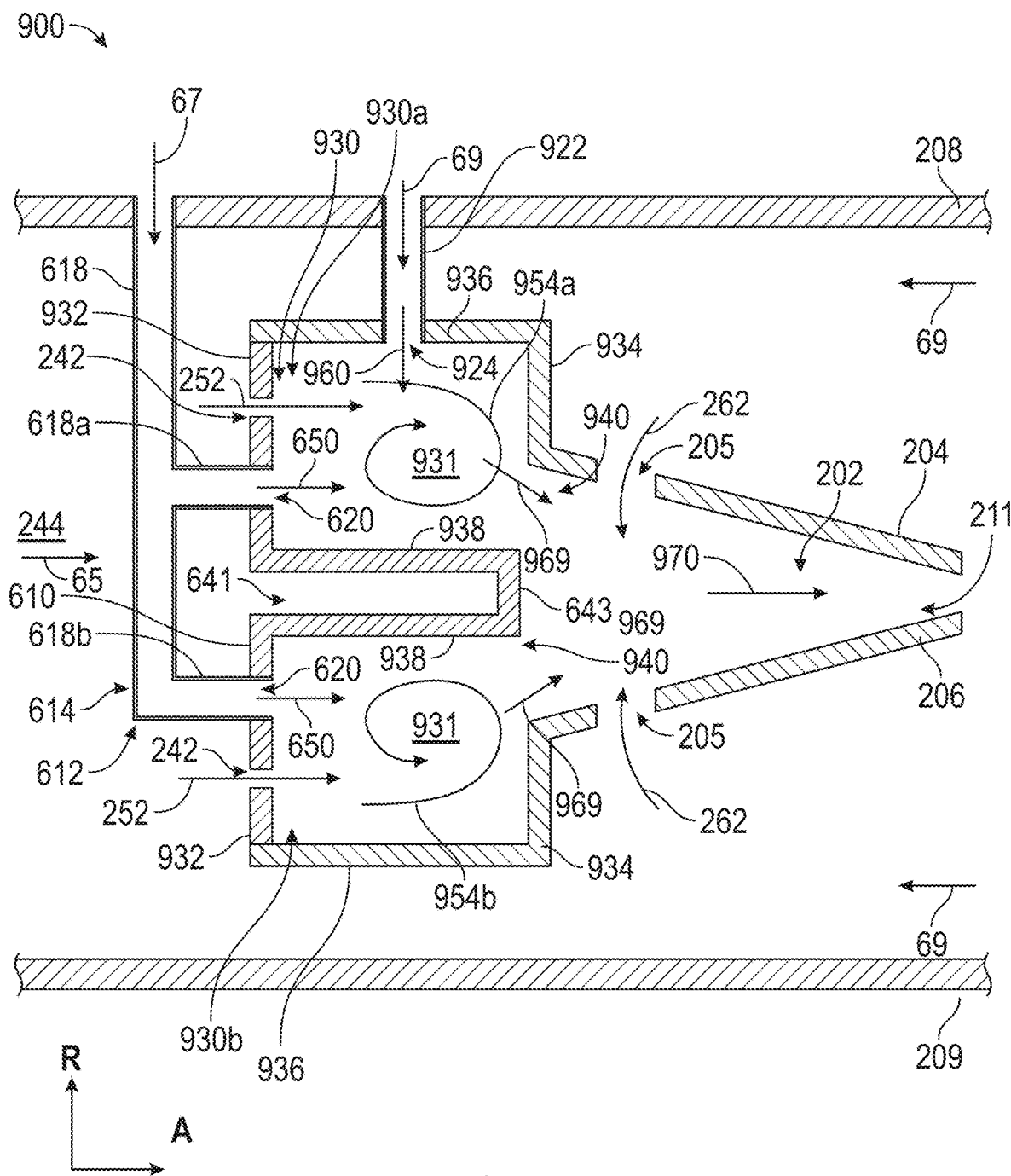
FIG. 9 is a schematic cross-sectional diagram of a combustor for a turbine engine, taken along a longitudinal centerline axis of the turbine engine, according to another embodiment.

FIG. 9 is a schematic cross-sectional diagram of a combustor 900 for a turbine engine, taken along a longitudinal centerline axis of the turbine engine, according to another embodiment. The combustor 900 is substantially similar to the combustors 200, 600, 800 of FIGS. 2, 6, and 8, respectively. The same reference numerals will be used for components of the combustor 900 that are the same as or similar to the components of the combustors 200, 600, 800 discussed above. The description of these components above also applies to this embodiment, and a detailed description of these components is omitted here. The combustor 900 has a plurality of TVCs 930 that is different than the plurality of TVCs 230, 630, 830 of FIGS. 2, 6, and 8, respectively.

Each of the plurality of TVCs 930 defines a combustion zone 931. The plurality of TVCs 930 includes a first TVC 930a and a second TVC 930b. Each of the plurality of TVCs 930 is defined by one or more walls 932, 934, 936, 938 (collectively referred to as the walls of the TVC 930). In particular, each of the plurality of TVCs 930 is defined by a first wall 932, a second wall 934, a third wall 936, and a fourth wall 938. The walls of each of the plurality of TVCs 930 are substantially similar to the walls of each of the plurality of TVCs 630 of FIG. 6. The first fuel injector 618a is disposed through the first wall 932 of the first TVC 930a such that the first fuel injector 618a injects the fuel 67 axially aftward into the first TVC 930a. The second fuel injector 618b is disposed through the first wall 932 of the second TVC 930b such that the second fuel injector 618b injects the fuel 67 axially aftward into the second TVC 930b.

The combustor 900 also includes one or more steam injectors 922 disposed through the third wall 936 of the first TVC 930a. The combustor 900 does not include a second steam injector disposed through the second TVC 930b. The one or more steam injectors 922 includes one or more steam injection holes 924 such that each steam injector 922 injects the steam 69 radially into the first TVC 930a, as detailed further below.

The combustor 900 operates substantially similar as to the combustor 200, 600, 800 of FIGS. 2, 6, and 8, respectively. The one or more steam injectors 922 inject the steam 69 radially into the first TVC 930a through the one or more steam injection holes 924 to generate a first steam stream 960. The first steam stream 960 includes steam and air. The plurality of fuel injectors 618 injects the fuel 67 through the one or more fuel injection holes 620 and into each respective TVC 830 to generate the fuel stream 650 within each of the plurality of TVCs 830. Within the first TVC 930a, the fuel stream 650 mixes with the compressed air stream 252 and with the first steam stream 960 by a first vortex 954a to generate a fuel-air-steam mixture in the first TVC 930a. The fuel-air-steam mixture is ignited and generates a first steam-combustion gases mixture 969 within each of the first TVC 930a. Within the second TVC 930b, the fuel stream 650 from the second fuel injector 618b mixes with the compressed air stream 252 by a second vortex 954b to generate a fuel-air mixture in the second TVC 930b. The fuel-air mixture is ignited and generates combustion gases 66 within the second TVC 930b. The first TVC 930a operably directs the first steam-combustion gases mixture 969 through the TVC opening 940 and into the main chamber 202. The second TVC 930b operably directs the combustion gases 66 from the second TVC 930b through the TVC opening 940 and into the main chamber 202. At the main chamber 202, the first steam-combustion gases mixture 969 mixes with combustion gases 66 from the second TVC 930b and with the second steam stream 262 to generate a second steam-combustion gases mixture 970 that is channeled downstream to the first stage turbine nozzle of the HP turbine (e.g., the HP turbine 28 of FIG. 1).

Figure 10:
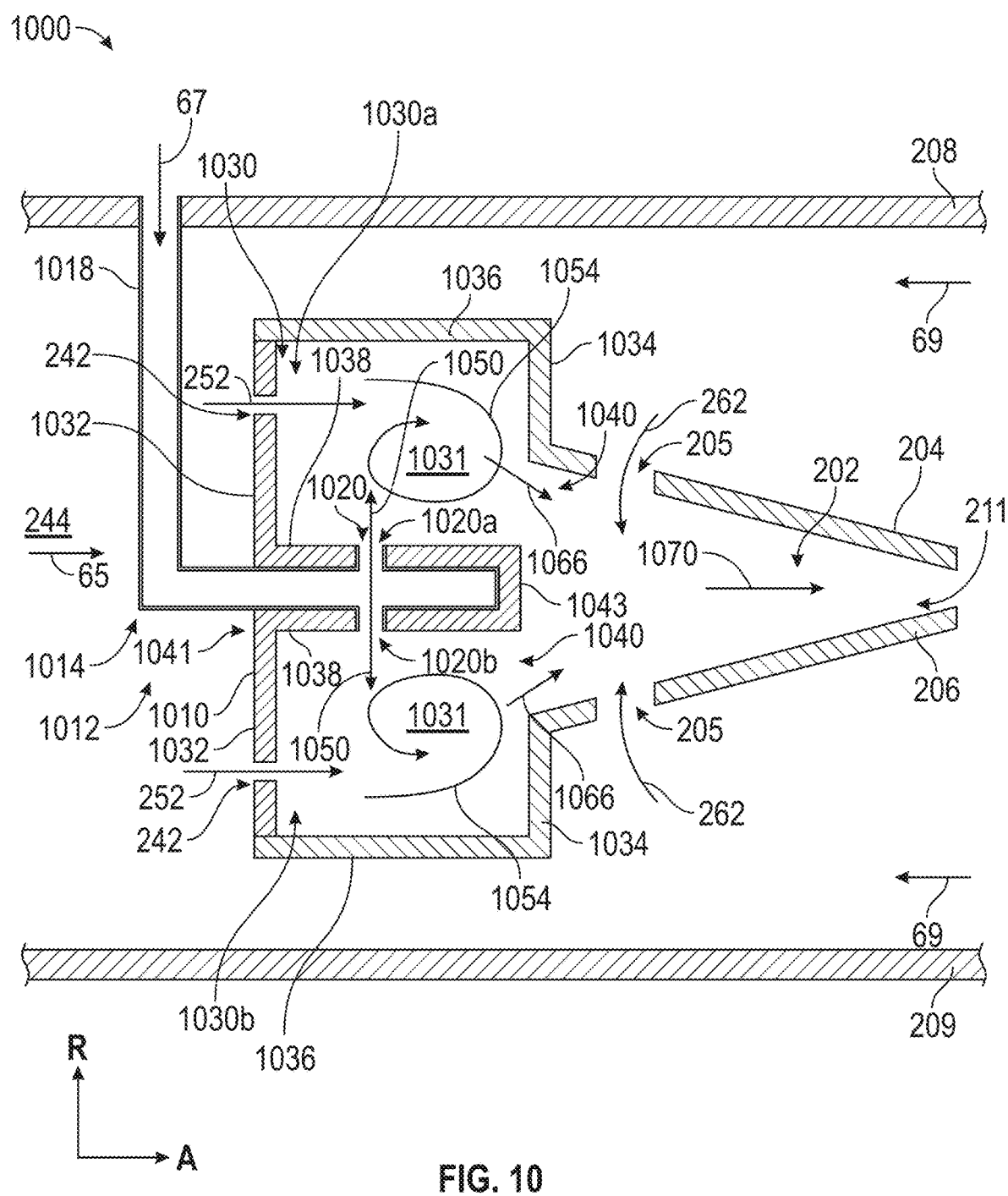
FIG. 10 is a schematic cross-sectional diagram of a combustor for a turbine engine, taken along a longitudinal centerline axis of the turbine engine, according to another embodiment.

FIG. 10 is a schematic cross-sectional diagram of a combustor 1000 for a turbine engine, taken along a longitudinal centerline axis of the turbine engine, according to another embodiment. The combustor 1000 is substantially similar to the combustor 200 of FIG. 2. The same reference numerals will be used for components of the combustor 1000 that are the same as or similar to the components of the combustor 200 discussed above. The description of these components above also applies to this embodiment, and a detailed description of these components is omitted here. The combustor 1000 includes an annular dome 1010, a plurality of mixing assemblies 1012, and a plurality of TVCs 1030 that are different than the annular dome 210, the plurality of mixing assemblies 212, and the plurality of TVCs 230 of FIG. 2, respectively. The combustor 1000 does not include a steam injector such as the steam injector 222 shown in FIG. 2.

Each of the plurality of mixing assemblies 1012 includes a main mixer 1014 and a plurality of fuel injectors 1018. The plurality of fuel injectors 1018 extends axially, as detailed further below. Each of the plurality of fuel injectors 1018 includes one or more fuel injection holes 1020 for injecting the fuel 67 therethrough. For example, each of the plurality of fuel injectors 1018 includes one or more first fuel injection holes 1020*a* and one or more second fuel injection holes 1020*b* for injecting the fuel 67 radially.

Each of the plurality of TVCs 1030 defines a combustion zone 1031. The plurality of TVCs 1030 includes a first TVC 1030*a* and a second TVC 1030*b*. Each of the plurality of TVCs 1030 is defined by one or more walls 1032, 1034, 1036, 1038 (collectively referred to as the walls of the TVC 1030). In particular, each of the plurality of TVCs 1030 is defined by a first wall 1032, a second wall 1034, a third wall 1036, and a fourth wall 1038. The walls of each of the plurality of TVCs 1030 are substantially similar to the walls of each of the plurality of TVCs 230 of FIG. 2. The fourth wall 1038, however, extends axially from the first wall 1032 to a TVC opening 1040 that is defined between the fourth wall 1038 and the outer liner 204 or the inner liner 206. The fourth wall 1038 of each of the first TVC 1030*a* and the second TVC 1030*b* are spaced from each other such that a radial gap 1041 is defined between the fourth wall 1038 of the first TVC 1030*a* and the fourth wall 1038 of the second TVC 1030*b*. The fourth wall 1038 of the first TVC 1030*a* and the fourth wall 1038 of the second TVC 1030*b* are coupled at an axially aft end by a liner extension portion 1043 that extends from the axially aft end of the fourth wall 1038 the first TVC 1030*a* to the axially aft end of the fourth wall 1038 of the second TVC 1030*b*. The plurality of fuel injectors 1018 is disposed through the radial gap 1041. The one or more fuel injection holes 1020 extend through the fourth wall 1038 of each TVC 1030. For example, the one or more first fuel injection holes 1020*a* extend through the fourth wall 1038 of the first TVC 1030*a* such that the plurality of fuel injectors 1018 injects the fuel 67 through the one or more first fuel injection holes 1020*a* into the first TVC 1030*a*. The one or more second fuel injection holes 1020*b* extend through the fourth wall 1038 of the second TVC 1030*b* such that the plurality of fuel injectors 1018 injects the fuel 67 through the one or more second fuel injection holes 1020*b* into the second TVC 1030*b*.

The combustor 1000 operates substantially similar as to the combustor 200 of FIG. 2. The plurality of fuel injectors 1018 inject the fuel 67 through the one or more fuel injection holes 1020 and into each respective TVC 1030 to generate a fuel stream 1050 within each of the plurality of TVCs 1030. The fuel stream 1050 mixes with the compressed air stream 252 by a vortex 1054 to generate the fuel-air mixture. The fuel-air mixture is ignited and generates combustion gases 1066 within each of the plurality of TVCs 1030. Each of the plurality of TVCs 1030 operably directs the combustion gases 1066 through the TVC opening 1040 and into the main chamber 202. At the main chamber 202, the combustion gases 1066 mix with the second steam stream 262 to generate a steam-combustion gases mixture 1070 that is channeled downstream to the first stage turbine nozzle of the HP turbine (e.g., the HP turbine 28 of FIG. 1).

Figure 11:
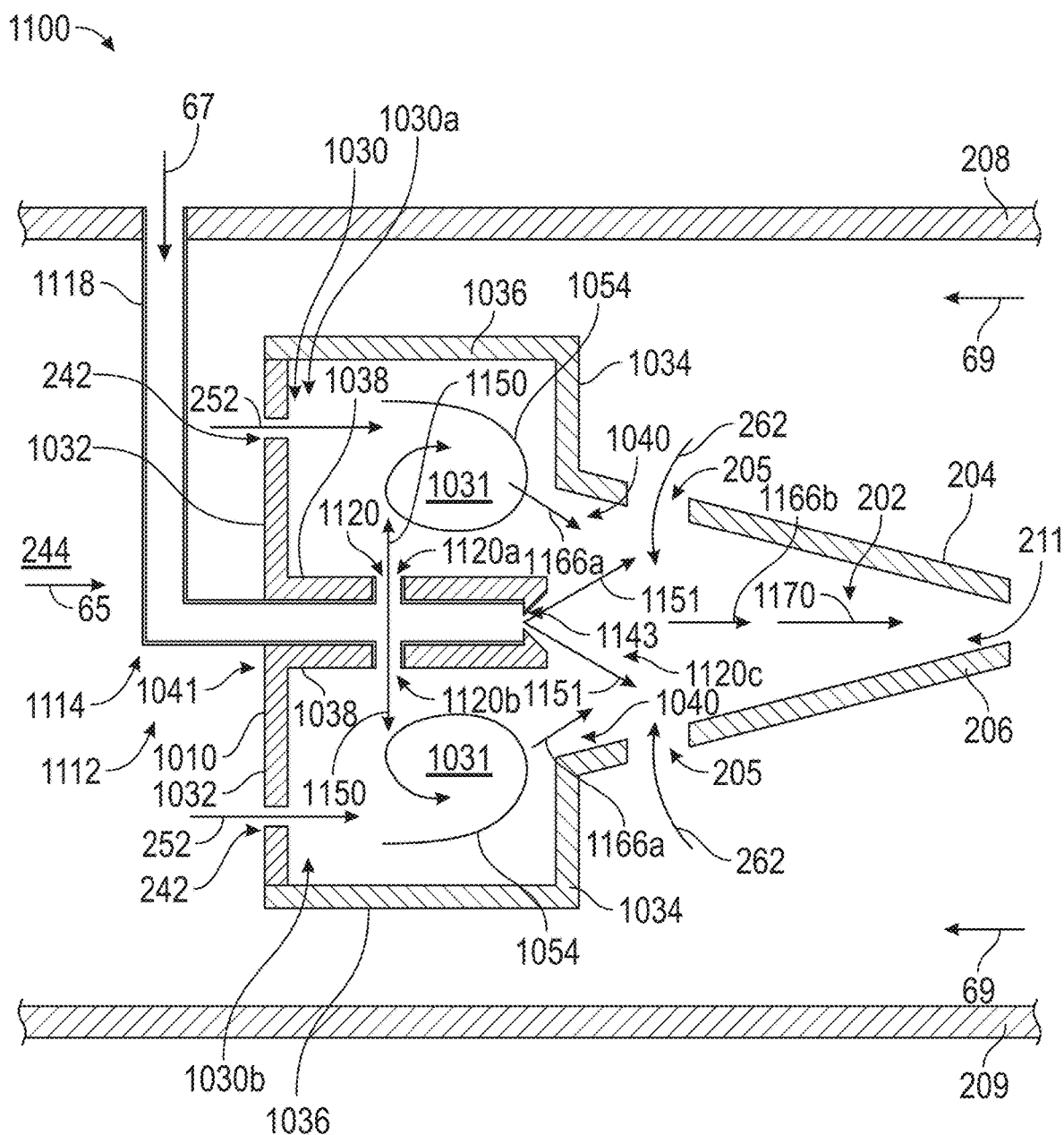
FIG. 11 is a schematic cross-sectional diagram of a combustor for a turbine engine, taken along a longitudinal centerline axis of the turbine engine, according to another embodiment.

FIG. 11 is a schematic cross-sectional diagram of a combustor 1100 for a turbine engine, taken along a longitudinal centerline axis of the turbine engine, according to another embodiment. The combustor 1100 is substantially similar to the combustor 1000 of FIG. 10. The same reference numerals will be used for components of the combustor 1100 that are the same as or similar to the components of the combustor 1000 discussed above. The description of these components above also applies to this embodiment, and a detailed description of these components is omitted here. The combustor 1100 includes a plurality of mixing assemblies 1012 that is different than the plurality of mixing assemblies 1012 of FIG. 10.

Each of the plurality of mixing assemblies 1112 includes a main mixer 1114 and a plurality of fuel injectors 1118. The plurality of fuel injectors 1118 extends axially, as detailed further below. Each of the plurality of fuel injectors 1118 includes one or more fuel injection holes 1120 for injecting the fuel 67 therethrough. For example, each of the plurality of fuel injectors 1118 includes one or more first fuel injection holes 1120*a* and one or more second fuel injection holes 1120*b* for injecting the fuel 67 radially, and one or more third fuel injection holes 1120*c* for injecting the fuel 67 axially, as detailed further below.

The plurality of fuel injectors 1118 is disposed through the radial gap 1041. The one or more first fuel injection holes 1120*a* extend through the fourth wall 1038 of the first TVC 1030*a* such that the plurality of fuel injectors 1118 injects the fuel 67 through the one or more first fuel injection holes 1120*a* into the first TVC 1030*a*. The one or more second fuel injection holes 1120*b* extend through the fourth wall 1038 of the second TVC 1030*b* such that the plurality of fuel injectors 1118 injects the fuel 67 through the one or more second fuel injection holes 1120*b* into the second TVC 1030*b*. The one or more third fuel injection holes 1120*c* extend through a liner extension portion 1143 such that the plurality of fuel injectors 1118 injects the fuel 67 through the one or more third fuel injection holes 1120*c* into the main chamber 202, as detailed further below.

The combustor 1100 operates substantially similar as to the combustor 1000 of FIG. 10. The plurality of fuel injectors 1118 injects the fuel 67 through the one or more first fuel injection holes 1120*a* and the one or more second fuel injection holes 1120*b* and into each respective TVC 1030 to generate a first fuel stream 1150 within each TVC 1030. The first fuel stream 1150 mixes with the compressed air stream 252 by the vortex 1054 to generate the fuel-air mixture. The fuel-air mixture is ignited and generates first combustion gases 1166*a* within each of the plurality of TVCs 1030. Each of the plurality of TVCs 1030 operably directs the first combustion gases 1166*a* through the TVC opening 1040 and into the main chamber 202. The plurality of fuel injectors 1118 injects the fuel 67 through the one or more third fuel injection holes 1120*c* into the main chamber 202 to generate a second fuel stream 1151. The second fuel stream 1151 mixes with the compressed air 65 (e.g., introduced through the one or more liner steam holes 205) in the main chamber 202 to generate a second fuel-air mixture that is ignited for a second flame that burns and generates second combustion gases 1166*b* within the main chamber 202. For example, the second steam stream 262 includes a mixture of the steam 69 and the compressed air 65. In some embodiments, the plurality of fuel injectors 1118 inject the compressed air 65 into the main chamber 202. At the main chamber 202, the first combustion gases 1166*a* from the plurality of TVCs 1030 mix with the second combustion gases 1166*b* in the main chamber 202 and with the second steam stream 262 to generate a steam-combustion gases mixture 1170 that is channeled downstream to the first stage turbine nozzle of the HP turbine (e.g., the HP turbine 28 of FIG. 1).

Figure 12:
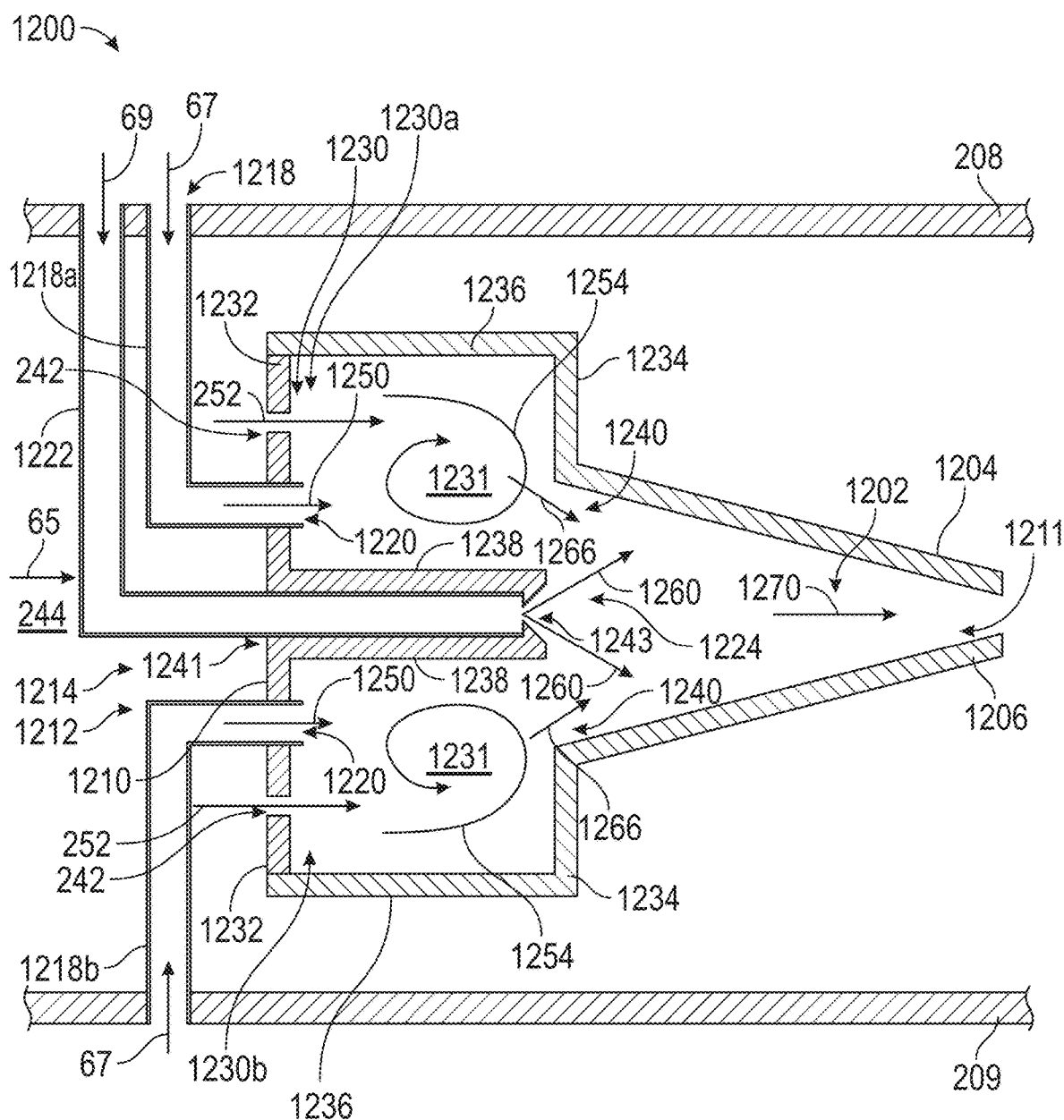
FIG. 12 is a schematic cross-sectional diagram of a combustor for a turbine engine, taken along a longitudinal centerline axis of the turbine engine, according to another embodiment.

FIG. 12 is a schematic cross-sectional diagram of a combustor 1200 for a turbine engine, taken along a longitudinal centerline axis of the turbine engine, according to another embodiment. The combustor 1200 is substantially similar to the combustor 1000 of FIG. 10. The same reference numerals will be used for components of the combustor 1200 that are the same as or similar to the components of the combustor 1000 discussed above. The description of these components above also applies to this embodiment, and a detailed description of these components is omitted here. The combustor 1200 includes an outer liner 1204 and an inner liner 1206, an annular dome 1210, a plurality of mixing assemblies 1212, and a plurality of TVCs 1230 that are different than the outer liner 204 and the inner liner 206, the annular dome 1210, the plurality of mixing assemblies 1012, and the plurality of TVCs 1030 of FIG. 10. The outer liner 1204 and the inner liner 1206 do not include steam holes disposed therethrough. The combustor 1200 includes a main chamber 1202 defined by the outer liner 1204 and the inner liner 1206. The main chamber 1202 extends to a combustor outlet 1211.

Each of the plurality of mixing assemblies 1212 includes a main mixer 1214 and a plurality of fuel injectors 1218. The plurality of fuel injectors 1218 extends axially, as detailed further below. Each of the plurality of fuel injectors 1218 includes one or more fuel injection holes 1220 for injecting the fuel 67 therethrough. The plurality of fuel injectors 1218 includes a first fuel injector 1218a and a second fuel injector 1218b. A steam system (e.g., the steam system 90 of FIG. 1) includes one or more steam injectors 1222. The one or more steam injectors 1222 include one or more steam injection holes 1224 for injecting the steam 69 therethrough.

Each of the plurality of TVCs 1230 defines a combustion zone 1231. The plurality of TVCs 1230 includes a first TVC 1230a and a second TVC 1230b. Each of the plurality of TVCs 1230 is defined by one or more walls 1232, 1234, 1236, 1238 (collectively referred to as the walls of the TVC 1230). In particular, each of the plurality of TVCs 1230 is defined by a first wall 1232, a second wall 1234, a third wall 1236, and a fourth wall 1238. The walls of each of the plurality of TVCs 1230 are substantially similar to the walls of each of the plurality of TVCs 1030 of FIG. 10. For example, the fourth wall 1238 extends axially from the first wall 1232 to a TVC opening 1240 that is defined between the fourth wall 1238 and the outer liner 1204 or the inner liner 1206. The fourth wall 1238 of each of the first TVC 1230a and the second TVC 1230b are spaced from each other such that a radial gap 1241 is defined between the fourth wall 1238 of the first TVC 1230a and the fourth wall 1238 of the second TVC 1230b. The fourth wall 1238 of the first TVC 1230a and the fourth wall 1238 of the second TVC 1230b are coupled at an axially aft end by a liner extension portion 1243 that extends from the axially aft end of the fourth wall 1238 the first TVC 1230a to the axially aft end of the fourth wall 1238 of the second TVC 1230b.

The plurality of fuel injectors 1218 is disposed through the first wall 1232 of each of the plurality of TVCs 1230. For example, the first fuel injector 1218a extends through the first wall 1232 of the first TVC 1230a such that the first fuel injector 1218a injects the fuel 67 through the one or more fuel injection holes 1220 axially aftward into the first TVC 1230a. The second fuel injector 1218b extends through the first wall 1232 of the second TVC 1230b such that the second fuel injector 1218b injects the fuel 67 through the one or more fuel injection holes 1220 axially aftward into the second TVC 1230b.

The one or more steam injectors 1222 extend through the radial gap 1241 and the one or more steam injection holes 1224 extend through the liner extension portion 1243. In this way, the one or more steam injectors 1222 inject the steam 69 axially aftward into the main chamber 202, as detailed further below.

The combustor 1200 operates substantially similar as to the combustor 1000 of FIG. 10. The plurality of fuel injectors 1218 injects the fuel 67 axially aftward into each respective TVC 1230 to generate a fuel stream 1250 within each of the plurality of TVCs 1230. The fuel stream 1250 mixes with the compressed air stream 252 by a vortex 1254 to generate the fuel-air mixture. The fuel-air mixture is ignited and generates combustion gases 1266 within each of the plurality of TVCs 1230. Each of the plurality of TVCs 1230 operably directs the combustion gases 1266 through the TVC opening 1240 and into the main chamber 202. The one or more steam injectors 1222 inject the steam 69 through the one or more steam injection holes 1224 axially aftward into the main chamber 202 to generate a steam stream 1260. At the main chamber 202, the combustion gases 1266 from the plurality of TVCs 1230 mix with the steam stream 1260 to generate a steam-combustion gases mixture 1270 that is channeled downstream to the first stage turbine nozzle of the HP turbine (e.g., the HP turbine 28 of FIG. 1).

Figure 13:
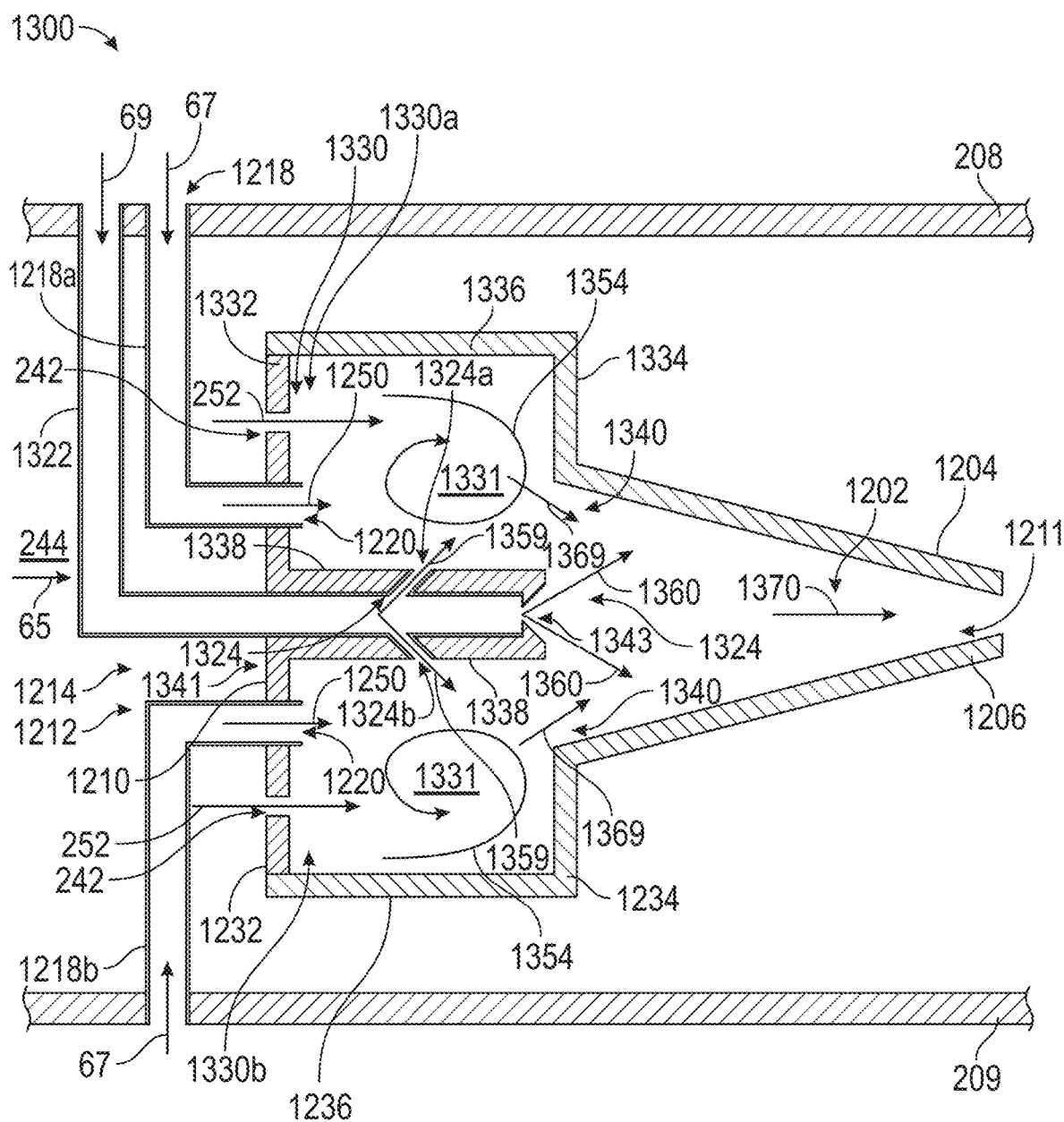
FIG. 13 is a schematic cross-sectional diagram of a combustor for a turbine engine, taken along a longitudinal centerline axis of the turbine engine, according to another embodiment.

FIG. 13 is a schematic cross-sectional diagram of a combustor 1300 for a turbine engine, taken along a longitudinal centerline axis of the turbine engine, according to another embodiment. The combustor 1300 is substantially similar to the combustor 1200 of FIG. 12. The same reference numerals will be used for components of the combustor 1300 that are the same as or similar to the components of the combustor 1200 discussed above. The description of these components above also applies to this embodiment, and a detailed description of these components is omitted here. The combustor 1300 includes a plurality of TVCs 1330 and one or more steam injectors 1322 that are different than the plurality of TVCs 1230 and the one or more steam injectors 1222 of FIG. 12, respectively.

Each of the plurality of TVCs 1330 defines a combustion zone 1331. The plurality of TVCs 1330 includes a first TVC 1330a and a second TVC 1330b. Each of the plurality of TVCs 1330 is defined by one or more walls 1332, 1334, 1336, 1338 (collectively referred to as the walls of the TVC 1330). In particular, each of the plurality of TVCs 1330 is defined by a first wall 1332, a second wall 1334, a third wall 1336, and a fourth wall 1338. The walls of each of the plurality of TVCs 1330 are substantially similar to the walls of each of the plurality of TVCs 1230 of FIG. 12. For example, the fourth wall 1338 extends axially from the first wall 1332 to a TVC opening 1340 that is defined between the fourth wall 1338 and the outer liner 1204 or the inner liner 1206. The fourth wall 1338 of each of the first TVC 1330a and the second TVC 1330b are spaced from each other such that a radial gap 1341 is defined between the fourth wall 1338 of the first TVC 1330a and the fourth wall 1338 of the second TVC 1330b. The fourth wall 1338 of the first TVC 1330a and the fourth wall 1338 of the second TVC 1330b are coupled at an axially aft end by a liner extension portion 1343 that extends from the axially aft end of the fourth wall 1338 the first TVC 1330a to the axially aft end of the fourth wall 1338 of the second TVC 1330b.

The one or more steam injectors 1322 extend through the radial gap 1341 and include one or more steam injection holes 1324. The one or more steam injection holes 1324 include one or more first steam injection holes 1324a that extend through the fourth wall 1238 of the first TVC 1330a such that the one or more steam injectors 1322 inject the steam 69 radially and axially aftward into the first TVC 1330a. The one or more steam injection holes 1324 include one or more second steam injection holes 1324b that extend through the fourth wall 1338 of the second TVC 1330b such that the one or more steam injectors 1322 inject the steam 69 radially and axially aftward into the second TVC 1330b. The one or more steam injection holes 1324 include one or more third steam injection holes 1324c that extend through liner extension portion 1343 such that the one or more steam injectors 1322 inject the steam 69 axially aftward into the main chamber 202.

The combustor 1300 operates substantially similar as to the combustor 1200 of FIG. 12. The one or more steam injectors 1322 inject the steam 69 through the one or more first steam injection holes 1324a and the one or more second steam injection holes 1324b into each respective TVC 1330 to generate a first steam stream 1359 in each respective TVC 1330. The first steam stream 1359 mixes with the fuel stream 1250 by a vortex 1354 at the combustion zone 1331 within each of the plurality of TVCs 1330 to generate a fuel-air-steam mixture. The fuel-air-steam mixture is ignited and generates a first steam-combustion gases mixture 1369. Each of the plurality of TVCs 1330 operably directs the first steam-combustion gases mixture 1369 through the TVC opening 1340 and into the main chamber 1202. The one or more steam injectors 1322 inject the steam 69 through the one or more third steam injection holes 1324c axially into the main chamber 1202 to generate a second steam stream 1360. At the main chamber 1202, the second steam stream 1360 mixes with the first steam-combustion gases mixture 1369 to generate a second steam-combustion gases mixture 1370 that is channeled downstream to the first stage turbine nozzle of the HP turbine (e.g., the HP turbine 28 of FIG. 1).

Figure 14:
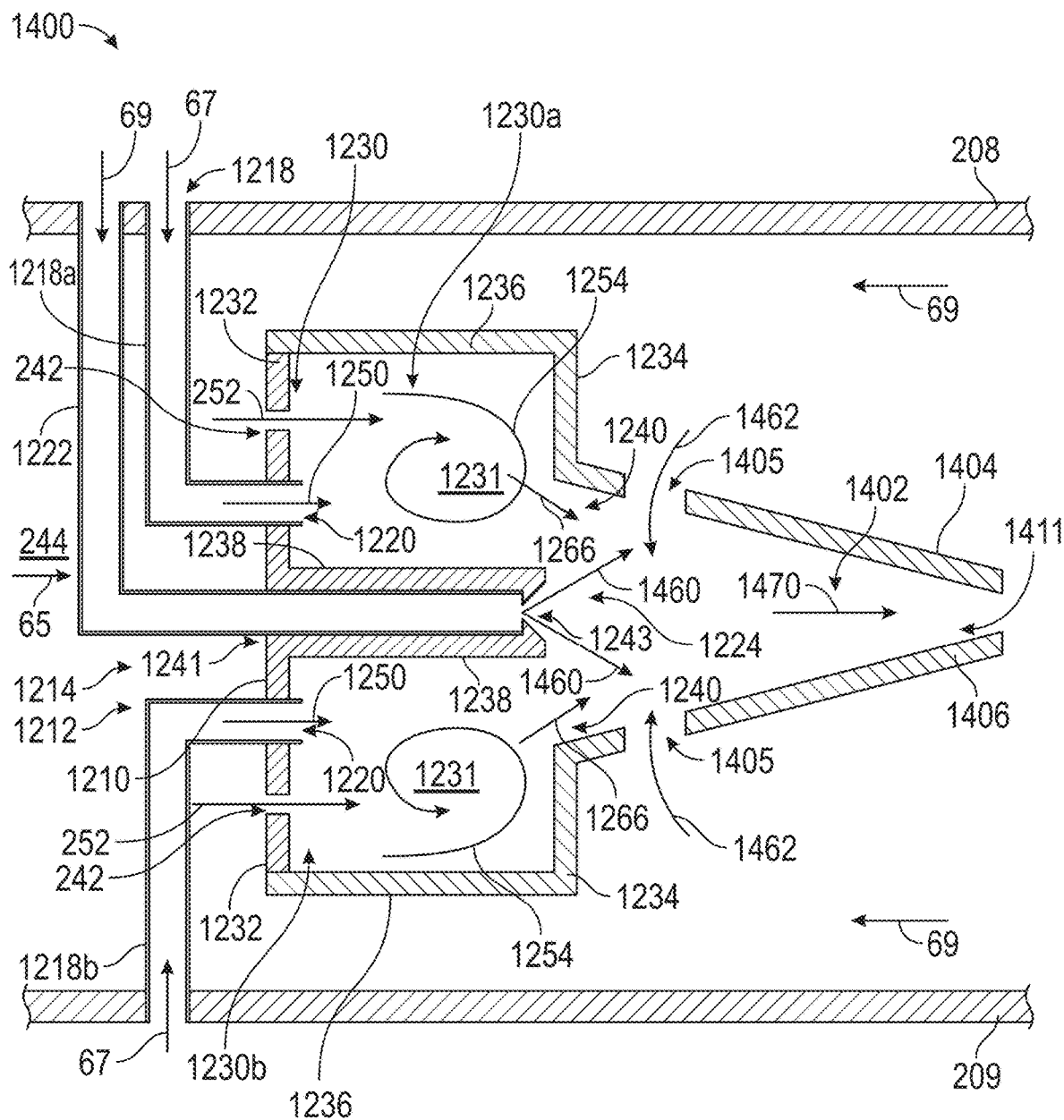
FIG. 14 is a schematic cross-sectional diagram of a combustor for a turbine engine, taken along a longitudinal centerline axis of the turbine engine, according to another embodiment.

FIG. 14 is a schematic cross-sectional diagram of a combustor 1400 for a turbine engine, taken along a longitudinal centerline axis of the turbine engine, according to another embodiment. The combustor 1400 is substantially similar to the combustor 1200 of FIG. 12. The same reference numerals will be used for components of the combustor 1400 that are the same as or similar to the components of the combustor 1200 discussed above. The description of these components above also applies to this embodiment, and a detailed description of these components is omitted here. The combustor 1400 includes an outer liner 1404 and an inner liner 1406 that are different than the outer liner 1204 and the inner liner 1206 of FIG. 12. In particular, the outer liner 1404 and the inner liner 1406 include one or more liner steam holes 1405 extending therethrough. The combustor 1400 includes a main chamber 1402 defined by the outer liner 1404 and the inner liner 1406. The main chamber 1402 extends to a combustor outlet 1411.

The combustor 1400 operates substantially similar as to the combustor 1200 of FIG. 12. The one or more steam injectors 1222 inject the steam 69 axially into the main chamber 1202 to generate a first steam stream 1460. The one or more liner steam holes 1405 operably direct the steam 69 into the main chamber 1202 to generate a second steam stream 1462. At the main chamber 1202, the combustion gases 1266 from the plurality of TVCs 1230 mix with the first steam stream 1460 and the second steam stream 1462 to generate a steam-combustion gases mixture 1470 that is channeled downstream to the first stage turbine nozzle of the HP turbine (e.g., the HP turbine 28 of FIG. 1).

Figure 15:
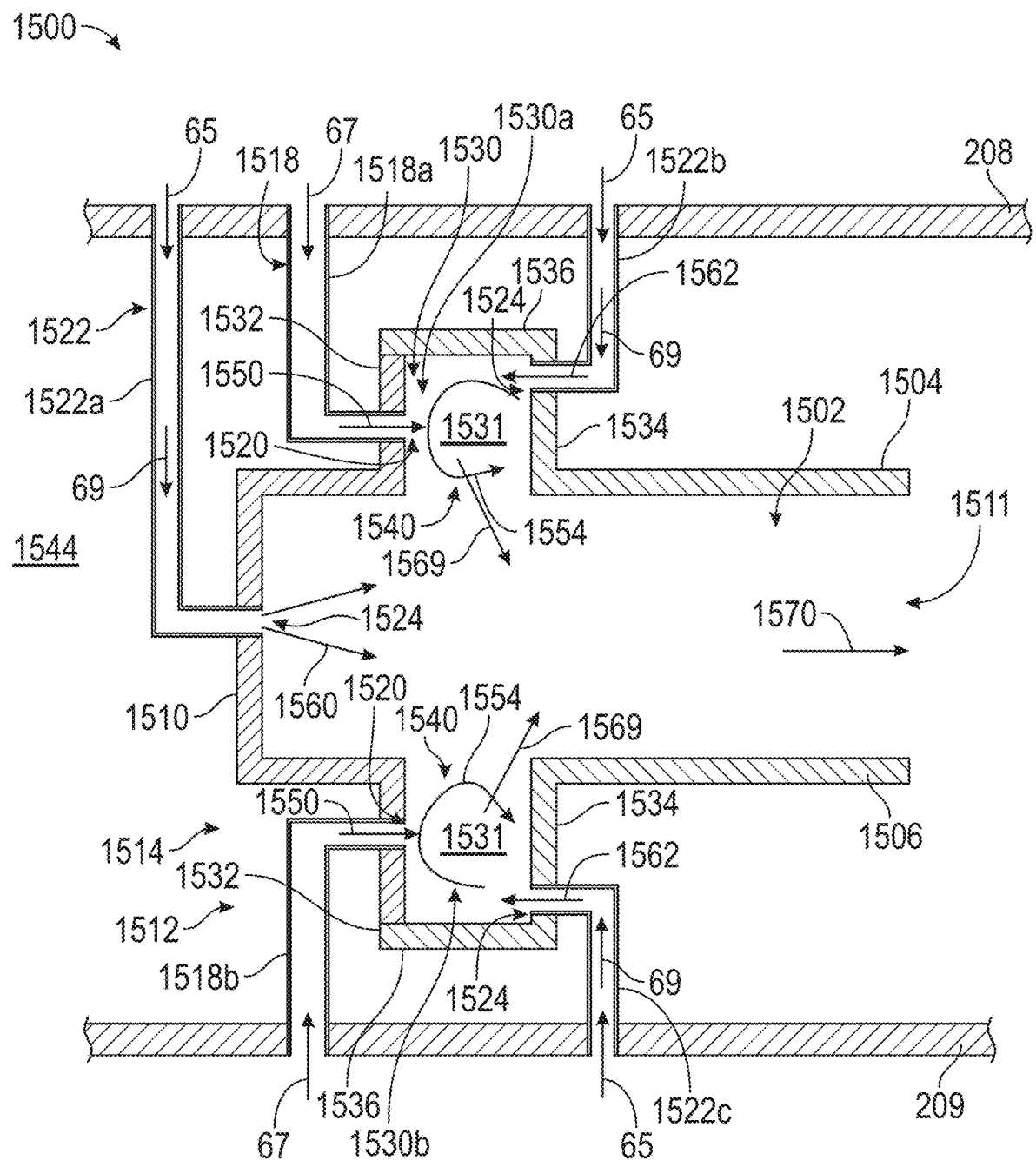
FIG. 15 is a schematic cross-sectional diagram of a combustor for a turbine engine, taken along a longitudinal centerline axis of the turbine engine, according to another embodiment.

FIG. 15 is a schematic cross-sectional diagram of a combustor 1500 for a turbine engine, taken along a longitudinal centerline axis of the turbine engine, according to another embodiment. The combustor 1500 is similar to the combustor 200 of FIG. 2. The same reference numerals will be used for components of the combustor 1500 that are the same as or similar to the components of the combustor 200 discussed above. The description of these components above also applies to this embodiment, and a detailed description of these components is omitted here. The combustor 1500 includes a main chamber 1502, an outer liner 1504, an inner liner 1506, a plurality of mixing assemblies 1512, a plurality of steam injectors 1522, and a plurality of TVCs 1530 that are different than the outer liner 204, the inner liner 206, the plurality of mixing assemblies 212, the one or more steam injectors 222, and the plurality of TVCs 230 of FIG. 2.

The outer liner 1504 and the inner liner 1506 extend generally axially and do not include steam holes therethrough. The combustor 1500 includes an annular dome 1510 that is coupled to the outer liner 1504 and the inner liner 1506. The main chamber 1502 extends to a combustor outlet 1511. A diffuser section 1544 is defined between the outer combustor casing 208 and the inner combustor casing 209 upstream of the annular dome 1510. Each of the plurality of mixing assemblies 1512 includes a mixer 1514 and a fuel injector 1518. For example, the combustor 1500 includes a first fuel injector 1518a and a second fuel injector 1518b. Each fuel injector 1518 includes one or more fuel injection holes 1520 for injecting the fuel 67 therethrough. The plurality of steam injectors 1522 includes a first steam injector 1522a, a second steam injector 1522b, and a third steam injector 1522c. Each of the plurality of steam injectors 1522 includes one or more steam injection holes 1524 for injecting the steam 69 and the compressed air 65 therethrough. The first steam injector 1522a is disposed through the annular dome 1510 to inject the steam 69 into the main chamber 1502, as detailed further below. Each of the plurality of steam injectors 1522 also receives a portion of the compressed air 65 and injects the portion of the compressed air 65, as detailed further below. For example, each of the plurality of steam injectors 1522 can be coupled to a compressed air bleed flowpath that directs the portion of the compressed air 65 from the HP compressor 24 (FIG. 1) or from the diffuser section 1544 to each of the plurality of steam injectors 1522.

The plurality of TVCs 1530 includes a first TVC 1530a and a second TVC 1530b. Each of the plurality of TVCs 1530 is defined by one or more walls 1532, 1534, 1536 (collectively referred to as the walls of the TVC 1530). In particular, each of the plurality of TVCs 1530 is defined by a first wall 1532, a second wall 1534, and a third wall 1536. Each of the plurality of TVCs 1530 also includes a TVC opening 1540 defined in the outer liner 1504 or the inner liner 1506. The plurality of TVCs 1530 does not include a fourth wall. Rather, the plurality of TVCs 1530 is positioned axially aft of the annular dome 1510 such that the plurality of TVCs 1530 is located downstream of an area of the annular dome 1510. Each of the plurality of TVCs 1530 also defines a combustion zone 1531 therein.

The first fuel injector 1518a extends through the first wall 1532 of the first TVC 1530a such that the first fuel injector 1518a injects the fuel 67 axially aftward into the first TVC 1530a. The second fuel injector 1518b extends through the first wall 1532 of the second TVC 1530b such that the second fuel injector 1518b injects the fuel 67 axially aftward into the second TVC 1530b. The second steam injector 1522b extends through the second wall 1534 of the first TVC 1530a such that the second steam injector 1522b injects the steam 69 and the compressed air 65 axially forward into the first TVC 1530a. The third steam injector 1522c extends through the second wall 1534 of the second TVC 1530b such that the third steam injector 1522c injects the steam 69 and the compressed air 65 axially forward into the second TVC 1530b.

In operation, the first steam injector 1522a injects the steam 69 and the compressed air 65 into the main chamber 1502 to generate a first steam-air stream 1560. The first steam injector 1522a injects the first steam-air stream 1560 axially forward of the plurality of TVCs 1530. The second steam injector 1522b and the third steam injector 1522c inject the steam 69 and the compressed air 65 axially forward into the respective TVCs 1530 to generate a second steam-air stream 1562 within each of the plurality of TVCs 1530. The plurality of TVCs 1530 swirls the second steam-air stream 1562 to generate a vortex 1554 within each respective TVC 1530. The fuel injectors 1518 inject the fuel 67 axially forward into the respective TVCs 1530 to generate a fuel stream 1550. The fuel stream 1550 mixes with the second steam-air stream 1562 at the vortex 1554 to generate a fuel-steam-air mixture that is ignited to generate a first steam-combustion gases mixture 1569. The plurality of TVCs 1530 operably directs the first steam-combustion gases mixture 1569 through the TVC opening 1540 and into the main chamber 1502. At the main chamber 1502, the first steam-air stream 1560 is directed axially aftward and the first steam-combustion gases mixture 1569 from both of the plurality of TVCs 1530 is directed downstream into the main chamber 1502 and mixes with the first steam-air stream 1560 to generate a second steam-combustion gases mixture 1570 that is channeled downstream to the first stage turbine nozzle of the HP turbine (e.g., the HP turbine 28 of FIG. 1). The total amount of the steam 69 injected into the main chamber 1502 includes a WAR of up to 30%. In some embodiments, the WAR varies from 0.0% to 30% based on the operating conditions of the turbine engine (e.g., startup, idle, taxi, takeoff, climb, cruise, descent), similar as to the embodiment of FIG. 2, detailed above.

Figure 16:
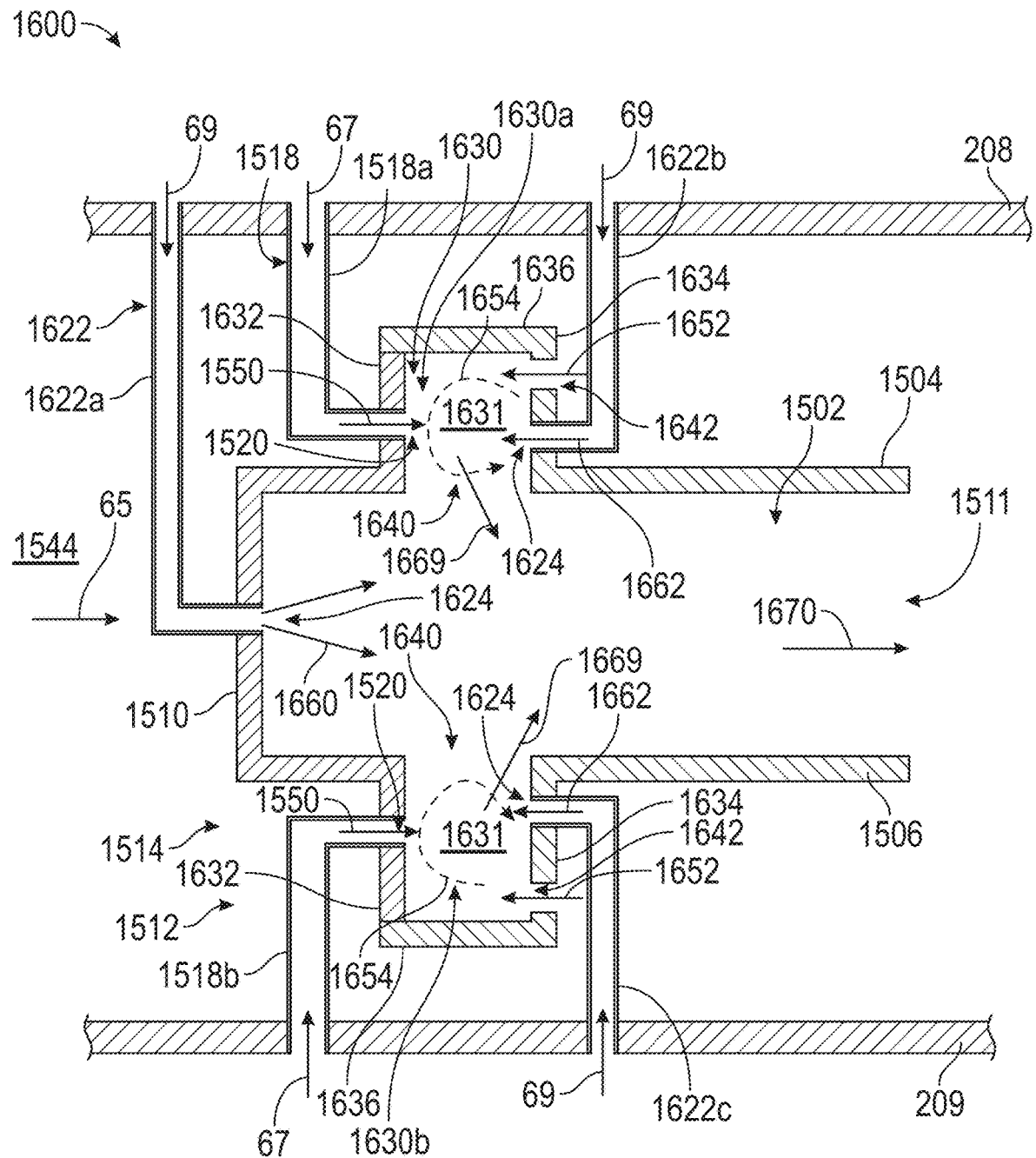
FIG. 16 is a schematic cross-sectional diagram of a combustor for a turbine engine, taken along a longitudinal centerline axis of the turbine engine, according to another embodiment.

FIG. 16 is a schematic cross-sectional diagram of a combustor 1600 for a turbine engine, taken along a longitudinal centerline axis of the turbine engine, according to another embodiment. The combustor 1600 is substantially similar to the combustor 1500 of FIG. 15. The same reference numerals will be used for components of the combustor 1600 that are the same as or similar to the components of the combustor 1500 discussed above. The description of these components above also applies to this embodiment, and a detailed description of these components is omitted here. The combustor 1600 includes a plurality of steam injectors 1622 and a plurality of TVCs 1630 that are different than the plurality of steam injectors 1522 and the plurality of TVCs 1530 of FIG. 15, respectively.

The plurality of steam injectors 1622 includes a first steam injector 1622a, a second steam injector 1622b, and a third steam injector 1622c. Each of the plurality of steam injectors 1522 includes one or more steam injection holes 1624 for injecting the steam 69 therethrough. The plurality of steam injectors 1622 does not inject the compressed air 65 in FIG. 16. Rather, the compressed air 65 is directed from the diffuser section 1544 and into the plurality of TVCs 1630, as detailed further below. The first steam injector 1622a is disposed through the annular dome 1510 to inject the steam 69 into the main chamber 1502.

Each of the plurality of TVCs 1630 defines a combustion zone 1631. The plurality of TVCs 1630 includes a first TVC 1630a and a second TVC 1630b. Each of the plurality of TVCs 1630 is defined by one or more walls 1632, 1634, 1636 (collectively referred to as the walls of the TVC 1630). In particular, each of the plurality of TVCs 1630 is defined by a first wall 1632, a second wall 1634, and a third wall 1636. Each TVC 1630 also includes a TVC opening 1640 defined in the outer liner 1504 or the inner liner 1506. Each of the plurality of TVCs 1630 includes one or more TVC air holes 1642 disposed through the second wall 1634 that operably direct the compressed air 65 therethrough.

In operation, the first steam injector 1622a injects the steam 69 into the main chamber 1502 to generate a first steam stream 1660. The second steam injector 1622b and the third steam injector 1622c inject the steam 69 axially forward into the respective TVCs 1630 to generate a second steam stream 1662. The one or more TVC air holes 1642 operably direct the compressed air 65 into each of the plurality of TVCs 1630 to generate a compressed air stream 1652 within each TVC 1630. The fuel injectors 1518 inject the fuel 67 axially forward into the respective TVCs 1530 to generate the fuel stream 1550. The fuel stream 1550 mixes with the compressed air stream 1652 and the second steam stream 1662 at a vortex 1654 to generate a fuel-air-steam mixture that is ignited to generate a first steam-combustion gases mixture 1669. The plurality of TVCs 1630 operably directs the first steam-combustion gases mixture 1669 through the TVC opening 1640 and into the main chamber 1502. At the main chamber 1502, the first steam stream 1660 is directed axially aftward and the first steam-combustion gases mixture 1669 from both of the plurality of TVCs 1630 is directed downstream into the main chamber 1502 and mixes with the first steam stream 1660 to generate a second steam-combustion gases mixture 1670 that is channeled downstream to the first stage turbine nozzle of the HP turbine (e.g., the HP turbine 28 of FIG. 1).

Figure 17:
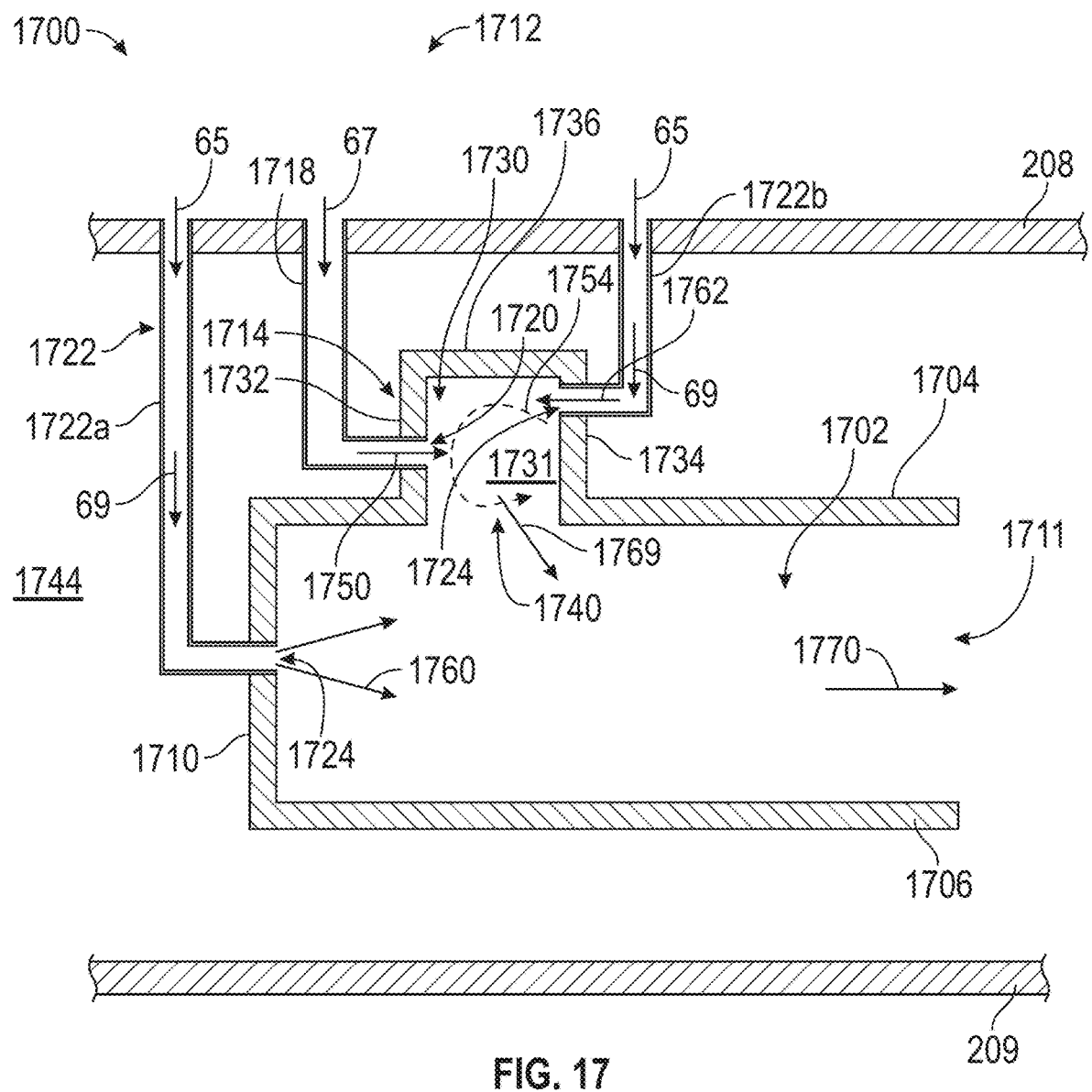
FIG. 17 is a schematic cross-sectional diagram of a combustor for a turbine engine, taken along a longitudinal centerline axis of the turbine engine, according to another embodiment.

FIG. 17 is a schematic cross-sectional diagram of a combustor 1700 for a turbine engine, taken along a longitudinal centerline axis of the turbine engine, according to another embodiment. The combustor 1700 is similar to the combustor 200 of FIG. 2. The same reference numerals will be used for components of the combustor 1700 that are the same as or similar to the components of the combustor 200 discussed above. The description of these components above also applies to this embodiment, and a detailed description of these components is omitted here. The combustor 1700 includes a main chamber 1702, an outer liner 1704, an inner liner 1706, a plurality of mixing assemblies 1712, a plurality of steam injectors 1722, and one or more TVCs 1730 that are different than the outer liner 204, the inner liner 206, the plurality of mixing assemblies 212, the one or more steam injectors 222, and the plurality of TVCs 230 of FIG. 2.

The outer liner 1704 and the inner liner 1706 extend generally axially and do not include steam holes therethrough. The combustor 1700 includes an annular dome 1710 that is coupled to the outer liner 1704 and the inner liner 1706. The main chamber 1702 extends to a combustor outlet 1711. A diffuser section 1744 is defined between the outer combustor casing 208 and the inner combustor casing 209 upstream of the annular dome 1710. Each of the plurality of mixing assemblies 1712 includes a mixer 1714 and a fuel injector 1718. Each fuel injector 1718 includes one or more fuel injection holes 1720 for injecting the fuel 67 therethrough. The plurality of fuel injectors 1718 is positioned only on the outer liner 1704 and not on the inner liner 1706. The plurality of steam injectors 1722 includes a first steam injector 1722a and a second steam injector 1722b. Each of the plurality of steam injectors 1722 includes one or more steam injection holes 1724 for injecting the steam 69 and the compressed air 65 therethrough. The first steam injector 1522a is disposed through the annular dome 1710 to inject the steam 69 into the main chamber 1702, as detailed further below. Each of the plurality of steam injectors 1722 also receives a portion of the compressed air 65 and injects the portion of the compressed air 65, as detailed further below. For example, each of the plurality of steam injectors 1722 can be coupled to a compressed air bleed flowpath that directs the portion of the compressed air 65 from the HP compressor 24 (FIG. 1) or from the diffuser section 1744 to each of the plurality of steam injectors 1722.

The one or more TVCs 1730 are each defined by one or more walls 1732, 1734, 1736 (collectively referred to as the walls of the TVC 1730). In particular, each of the one or more TVCs 1730 is defined by a first wall 1732, a second wall 1734, and a third wall 1736. The one or more TVCs 1730 extend from the outer liner 1704 in FIG. 17. In some embodiments, the one or more TVCs 1730 extend from the inner liner 1706. The one or more TVCs 1730 also include a TVC opening 1740 defined in the outer liner 1704. The one or more TVCs 1730 do not include a fourth wall. Rather, the one or more TVCs 1730 are positioned axially aft of the annular dome 1710 such that the one or more TVCs 1730 are located downstream of an area of the annular dome 1710. The one or more TVCs 1730 also define a combustion zone 1731 therein.

The plurality of fuel injectors 1718 extends through the first wall 1732 of the one or more TVCs 1730 such that the plurality of fuel injectors 1718 injects the fuel 67 axially aftward into the one or more TVCs 1730. The second steam injector 1722b extends through the second wall 1734 of the one or more TVCs 1730 such that the second steam injector 1722b injects the steam 69 and the compressed air 65 axially forward into the one or more TVCs 1730.

In operation, the first steam injector 1722a injects the steam 69 and the compressed air 65 into the main chamber 1702 to generate a first steam-air stream 1760. The first steam injector 1722a injects the first steam-air stream 1760 axially forward of the one or more TVCs 1730. The second steam injector 1722b injects the steam 69 and the compressed air 65 axially forward into the one or more TVCs 1730 to generate a second steam-air stream 1762 within the one or more TVCs 1730. The one or more TVCs 1730 swirl the second steam-air stream 1762 to generate a vortex 1754 within the one or more TVCs 1730. The plurality of fuel injectors 1518 injects the fuel 67 axially forward into the one or more TVCs 1730 to generate a fuel stream 1750. The fuel stream 1750 mixes with the second steam-air stream 1762 at the vortex 1754 to generate a first steam-combustion gases mixture 1769. The one or more TVCs 1730 operably direct the first steam-combustion gases mixture 1769 through the TVC opening 1740 and into the main chamber 1702. At the main chamber 1702, the first steam-air stream 1760 is directed axially aftward and the first steam-combustion gases mixture 1769 from the one or more TVCs 1730 is directed downstream into the main chamber 1702 and mixes with the first steam-air stream 1760 to generate a second steam-combustion gases mixture 1770 that is channeled downstream to the first stage turbine nozzle of the HP turbine (e.g., the HP turbine 28 of FIG. 1).

Figure 18:
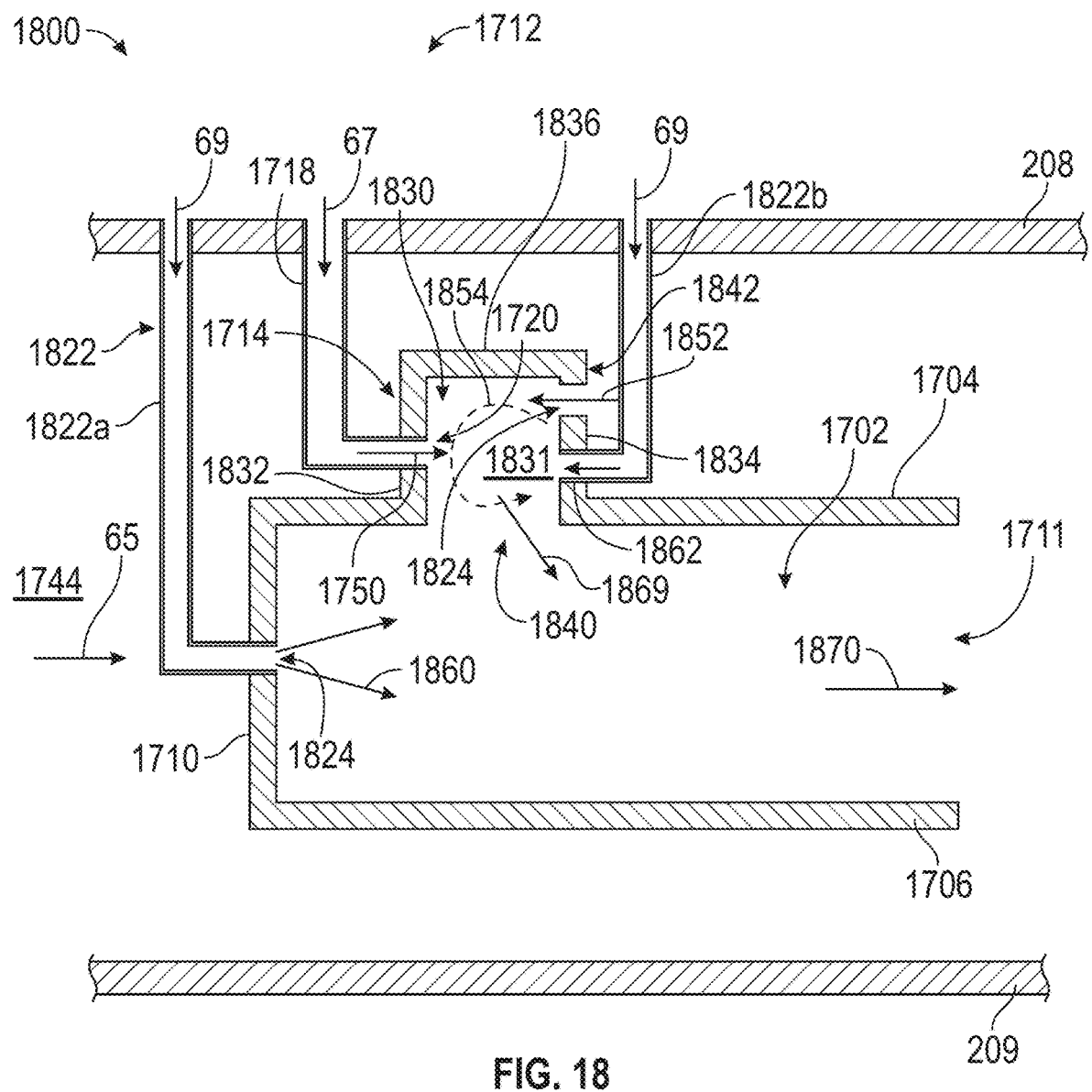
FIG. 18 is a schematic cross-sectional diagram of a combustor for a turbine engine, taken along a longitudinal centerline axis of the turbine engine, according to another embodiment.

FIG. 18 is a schematic cross-sectional diagram of a combustor 1800 for a turbine engine, taken along a longitudinal centerline axis of the turbine engine, according to another embodiment. The combustor 1800 is substantially similar to the combustor 1700 of FIG. 17. The same reference numerals will be used for components of the combustor 1800 that are the same as or similar to the components of the combustor 1700 discussed above. The description of these components above also applies to this embodiment, and a detailed description of these components is omitted here. The combustor 1800 includes a plurality of steam injectors 1822 and one or more TVCs 1830 that are different than the plurality of steam injectors 1722 and the one or more TVCs 1730 of FIG. 17, respectively.

The plurality of steam injectors 1822 includes a first steam injector 1822a and a second steam injector 1822b. Each of the plurality of steam injectors 1822 includes one or more steam injection holes 1824 for injecting the steam 69 therethrough. The plurality of steam injectors 1822 does not inject the compressed air 65 in FIG. 18. Rather, the compressed air 65 is directed from the diffuser section 1744 and into the one or more TVCs 1830, as detailed further below. The first steam injector 1822a is disposed through the annular dome 1710 to inject the steam 69 into the main chamber 1702.

The one or more TVCs 1830 define a combustion zone 1831. The one or more TVCs 1830 are each defined by one or more walls 1832, 1834, 1836 (collectively referred to as the walls of the TVC 1830). In particular, the one or more TVCs 1830 are defined by a first wall 1832, a second wall 1834, and a third wall 1836. Each of the one or more TVCs 1830 also includes a TVC opening 1840 defined in the outer liner 1704 or the inner liner 1706. Each of the one or more TVCs 1830 includes one or more TVC air holes 1842 disposed through the second wall 1834 that operably direct the compressed air 65 therethrough.

In operation, the first steam injector 1822a injects the steam 69 into the main chamber 1702 to generate a first steam stream 1860. The second steam injector 1822b injects the steam 69 axially forward into the one or more TVCs 1830 to generate a second steam stream 1862. The one or more TVC air holes 1842 operably direct the compressed air 65 into the one or more TVCs 1830 to generate a compressed air stream 1852 within one or more TVCs 1830. The fuel injectors 1718 inject the fuel 67 axially forward into the one or more TVCs 1830 to generate the fuel stream 1750. The fuel stream 1750 mixes with the compressed air stream 1852 at a vortex 1854 to generate a fuel-air mixture that is ignited to generate a first steam-combustion gases mixture 1869. The one or more TVCs 1830 operably direct the first steam-combustion gases mixture 1869 through the TVC opening 1840 and into the main chamber 1702. At the main chamber 1702, the first steam stream 1860 is directed axially aftward and the first steam-combustion gases mixture 1869 from the one or more TVCs 1830 is directed downstream into the main chamber 1702 and mixes with the first steam stream 1860 to generate a second steam-combustion gases mixture 1870 that is channeled downstream to the first stage turbine nozzle of the HP turbine (e.g., the HP turbine 28 of FIG. 1).

Accordingly, the embodiments of the present disclosure detailed herein provide for a combustor having a main chamber and a plurality of TVCs with combustion the plurality of TVCs and steam injection into the main chamber. Such a configuration provides for flame stability within the combustor at different operating conditions (e.g., low-power, mid-power, and high-power). The embodiments of the present disclosure enable a greater amount of steam to be injected into the combustor without sacrificing operability of the combustor, as compared to combustors without the benefit of the present disclosure. For example, typically a high amount of steam injected into the combustor leads to flameout of the flame, but the present disclosure provides for a majority of the steam to be injected into the main chamber, away from plurality of TVCs, to avoid flameout of the flame in the plurality of TVCs. Such a configuration of injecting the steam into the main chamber and away from the plurality of TVCs enables a greater amount of steam that can be injected into the combustor, as compared to combustors without the benefit of the present disclosure. For example, the combustion in the plurality of TVCs and the majority of the steam into the main chamber away from (and downstream of) the plurality of TVCs prevents the majority of the steam from flowing near the flame within the plurality of TVCs. In this way, the present disclosure allows for a greater amount of steam to be injected into the combustor, while preventing the steam from choking the flame within the plurality of TVCs, thereby reducing emissions (e.g., $NO_x$ emissions, nvPM emissions, CO, and noise) and reducing SFC, while providing for flame stability (e.g., avoiding flameout), as compared to combustors without the benefit of the present disclosure.

Further aspects of the present disclosure are provided by the subject matter of the following clauses.

A turbine engine comprises a fan and a core turbine engine comprising a compressor section, a combustion section, and a turbine section. The combustion section comprises a combustor comprising a main chamber including an outer liner and an inner liner, and a trapped vortex cavity extending from at least one of the outer liner or the inner liner, a plurality of mixing assemblies that operably injects a fuel-air mixture into the trapped vortex cavity to produce combustion gases. The trapped vortex cavity injects the combustion gases into the main chamber. The turbine engine comprises a steam system in fluid communication with the main chamber, the steam system operably injecting steam into the main chamber such that the steam flows downstream of the trapped vortex cavity.

The turbine engine of the preceding clause, a water-to-air ratio of the steam and compressed air in the main chamber being 0.0% to 60%.

The turbine engine of any preceding clause, the water-to-air ratio of the steam and compressed air in the main chamber being 5% to 60%.

The turbine engine of any preceding clause, the main chamber being defined downstream of the trapped vortex cavity.

The turbine engine of any preceding clause, the steam system injecting the steam downstream of the trapped vortex cavity.

The turbine engine of any preceding clause, the plurality of mixing assemblies including a plurality of fuel injectors that operably injects the fuel into the trapped vortex cavity.

The turbine engine of any preceding clause, the trapped vortex cavity defines a combustion zone, the combustion gases being produced in the combustion zone, and the steam system injecting the steam into the main chamber such that the combustion gases flow from the combustion zone towards the steam in the main chamber.

The turbine engine of any preceding clause, the trapped vortex cavity defining a trapped vortex cavity opening such that the trapped vortex cavity is in fluid communication with the main chamber, and the trapped vortex cavity injects the combustion gases through the trapped vortex cavity opening into the main chamber.

The turbine engine of any preceding clause, the main chamber mixes the combustion gases with the steam to generate a steam-combustion gases mixture in the main chamber.

The turbine engine of any preceding clause, the main chamber generating the steam-combustion gases mixture downstream of the trapped vortex cavity.

The turbine engine of any preceding clause, the trapped vortex cavity including one or more walls and one or more trapped vortex cavity air holes disposed in at least one of the one or more walls, the one or more trapped vortex cavity air holes operably directing compressed air into the trapped vortex cavity.

The turbine engine of any preceding clause, the one or more trapped vortex cavity air holes operably directing the compressed air into the trapped vortex cavity to generate a vortex in the trapped vortex cavity.

The turbine engine of any preceding clause, the steam system including one or more steam lines for providing the steam to a steam injector.

The turbine engine of any preceding clause, the steam system generating steam from exhaust of the turbine engine.

The turbine engine of any preceding clause, the steam system including one or more liner steam holes in the outer liner or the outer liner, the one or more liner steam holes operably directing the steam through the outer liner or the inner liner into the main chamber.

The turbine engine of any preceding clause, the plurality of mixing assemblies including a plurality of fuel injectors.

The turbine engine of any preceding clause, the plurality of fuel injectors including a first fuel injector and a second fuel injector.

The turbine engine of any preceding clause, the first fuel injector including one or more first fuel injection holes that operably inject the fuel radially outward.

The turbine engine of any preceding clause, the second fuel injector including one or more second fuel injection holes that operably inject the fuel radially inward.

The turbine engine of any preceding clause, the steam system further comprising one or more steam injectors.

The turbine engine of any preceding clause, the one or more steam injectors being coupled with the plurality of mixing assemblies.

The turbine engine of any preceding clause, the one or more steam injectors including one or more steam injection holes for operably injecting the steam therethrough.

The turbine engine of any preceding clause, the one or more steam injection holes being located on the one or more steam injectors to operably inject the steam axially aftward into the main chamber.

The turbine engine of any preceding clause, the one or more steam injection holes being located on the one or more steam injectors to operably inject the steam radially into the main chamber.

The turbine engine of any preceding clause, the trapped vortex cavity including a plurality of trapped vortex cavities.

The turbine engine of the preceding clause, the plurality of trapped vortex cavities including a first trapped vortex cavity and a second trapped vortex cavity.

The turbine engine of any preceding clause, the plurality of fuel injectors being positioned to inject the fuel radially into each trapped vortex cavity.

The turbine engine of any preceding clause, each trapped vortex cavity being defined by a first wall, a second wall, and a third wall.

The turbine engine of the preceding clause, each trapped vortex cavity being further defined by a fourth wall.

The turbine engine of any preceding clause, each trapped vortex cavity having a generally rectangular cross section.

The turbine engine of any preceding clause, each trapped vortex cavity having a generally circular cross section.

The turbine engine of any preceding clause, further comprising an annular dome positioned at a forward end of the outer liner or the inner liner.

The turbine engine of any preceding clause, the plurality of fuel injectors extending through the annular dome to separate the first trapped vortex cavity and the second trapped vortex cavity.

The turbine engine of any preceding clause, the plurality of fuel injectors being disposed between the fourth wall of the first trapped vortex cavity and the fourth wall of the second trapped vortex cavity.

The turbine engine of any preceding clause, each trapped vortex cavity being located radially outward from the main chamber.

The turbine engine of any preceding clause, the main chamber being defined downstream of the plurality of trapped vortex cavities.

The turbine engine of any preceding clause, the outer liner and the inner liner being angled towards each other to define a converging nozzle.

The turbine engine of any preceding clause, the one or more liner steam holes being positioned axially aft of the plurality of trapped vortex cavities.

The turbine engine of any preceding clause, the one or more trapped vortex cavity air holes defined through the first wall of each trapped vortex cavity.

The turbine engine of any preceding clause, the plurality of fuel injectors injecting the fuel radially into each trapped vortex cavity to generate a fuel stream within each trapped vortex cavity.

The turbine engine of any preceding clause, the one or more trapped vortex cavity air holes operably injecting the compressed air into each trapped vortex cavity.

The turbine engine of any preceding clause, each trapped vortex cavity mixing the fuel and the compressed air to generate the fuel-air mixture.

The turbine engine of any preceding clause, the one or more trapped vortex cavity air holes operably injecting the compressed air axially aftward into each trapped vortex cavity.

The turbine engine of any preceding clause, the one or more steam injectors operably injecting the steam to generate a first steam stream in the main chamber.

The turbine engine of the preceding clause, the one or more liner steam holes operably injecting the steam into the main chamber to generate a second steam stream in the main chamber.

The turbine engine of any preceding clause, the combustor operably mixing the combustion gases with the first steam stream and the second steam stream to generate a steam-combustion gases mixture.

The turbine engine of any preceding clause, the one or more liner steam holes being angled such that the second steam stream is angled other than ninety degrees with respect to a longitudinal centerline axis of the combustor.

The turbine engine of any preceding clause, further comprising a combustor outlet at an aft end of the main chamber.

The turbine engine of any preceding clause, the main chamber operably directing the steam-combustion gases mixture through the combustor outlet.

The turbine engine of any preceding clause, the steam system not injecting the steam into the main chamber during a low-power operation of the turbine engine.

The turbine engine of any preceding clause, the water-to-air ratio varying from 0.0% to 60% based on the operating conditions of the turbine engine.

The turbine engine of any preceding clause, the water-to-air ratio being zero percent to thirty percent (0% to 30%) during low-power conditions, being one percent to forty percent (1% to 40%) during mid-power conditions, and being two percent to sixty percent (2% to 60%) during high-power conditions.

The turbine engine of any preceding clause, the one or more trapped vortex cavity air holes including a plurality of discrete air holes.

The turbine engine of any preceding clause, the plurality of fuel injectors being annular about the longitudinal centerline axis.

The turbine engine of any preceding clause, the one or more fuel injection holes including a plurality of discreate fuel injection holes that are spaced circumferentially about the plurality of fuel injectors.

The turbine engine of any preceding clause, the one or more steam injectors being annular about the longitudinal centerline axis.

The turbine engine of any preceding clause, the one or more fuel injection holes and the one or more steam injection holes alternating circumferentially about the plurality of fuel injectors such that the fuel and the steam are injected radially into the plurality of trapped vortex cavities.

The turbine engine of any preceding clause, the one or more liner steam holes including a plurality of discrete liner steam holes that is spaced circumferentially about the outer liner or the inner liner.

The turbine engine of any preceding clause, the plurality of trapped vortex cavities being annular about the plurality of fuel injectors.

The turbine engine of any preceding clause, the plurality of fuel injectors being cylindrical.

The turbine engine of any preceding clause, the plurality of fuel injectors including a first fuel injector disposed to inject the fuel into the first trapped vortex cavity.

The turbine engine of any preceding clause, the plurality of fuel injectors including a second fuel injector disposed to inject the fuel into the second trapped vortex cavity.

The turbine engine of any preceding clause, the first fuel injector being disposed through the first wall of the first trapped vortex cavity such that the first fuel injector injects the fuel axially aftward into the first trapped vortex cavity.

The turbine engine of any preceding clause, the second fuel injector being disposed through the first wall of the second trapped vortex cavity such that the second fuel injector injects the fuel axially aftward into the second trapped vortex cavity.

The turbine engine of any preceding clause, the first fuel injector being disposed through the third wall of the first trapped vortex cavity such that the first fuel injector injects the fuel radially into the first trapped vortex cavity.

The turbine engine of any preceding clause, the second fuel injector being disposed through the third wall of the second trapped vortex cavity such that the second fuel injector injects the fuel radially into the second trapped vortex cavity.

The turbine engine of any preceding clause, further comprising a liner extension portion that extends from the fourth wall of the first trapped vortex cavity to the fourth wall of the second trapped vortex cavity.

The turbine engine of any preceding clause, the fourth wall of the first trapped vortex cavity being spaced from the fourth wall of the second trapped vortex cavity such that a gap is defined between the fourth wall of the first trapped vortex cavity and the fourth wall of the second trapped vortex cavity.

The turbine engine of any preceding clause, the one or more steam injectors including a first steam injector disposed to inject the steam into the first trapped vortex cavity.

The turbine engine of any preceding clause, the one or more steam injectors including a second steam injector disposed to inject the steam into the second trapped vortex cavity.

The turbine engine of any preceding clause, the first steam injector being disposed through the third wall of the first trapped vortex cavity to inject the steam radially into the first trapped vortex cavity.

The turbine engine of any preceding clause, the first steam injector being disposed through the third wall of the second trapped vortex cavity to inject the steam radially into the second trapped vortex cavity.

The turbine engine of any preceding clause, the one or more steam injectors being disposed to inject the steam into the first trapped vortex cavity.

The turbine engine of any preceding clause, the one or more steam injectors being disposed through the third wall of the first trapped vortex cavity to inject the steam radially into the first trapped vortex cavity.

The turbine engine of any preceding clause, the plurality of fuel injectors being disposed in the gap defined between the fourth wall of the first trapped vortex cavity and the fourth wall of the second trapped vortex cavity.

The turbine engine of any preceding clause, the plurality of fuel injectors including the one or more fuel injection holes for injecting the fuel therethrough.

The turbine engine of any preceding clause, the one or more fuel injection holes being disposed to inject the fuel radially into the plurality of trapped vortex cavities.

The turbine engine of any preceding clause, the one or more fuel injection holes including one or more first fuel injection holes for injecting the fuel into the first trapped vortex cavity.

The turbine engine of any preceding clause, the one or more fuel injection holes including one or more second fuel injection holes for injecting the fuel into the second trapped vortex cavity.

The turbine engine of any preceding clause, the one or more fuel injection holes including one or more third fuel injection holes for injecting the fuel axially into the main chamber.

The turbine engine of any preceding clause, the fuel stream in the plurality of TVCs being a first fuel stream, the one or more fuel injectors injecting the fuel through the one or more third fuel injection holes to generate a second fuel stream to generate a second fuel-air mixture in the main chamber.

The turbine engine of any preceding clause, the one or more steam injectors being disposed through the gap between the fourth wall of the first trapped vortex cavity and the fourth wall of the second trapped vortex cavity.

The turbine engine of any preceding clause, the one or more steam injectors including one or more first steam injection holes for injecting the steam axially into the main chamber.

The turbine engine of any preceding clause, the one or more steam injectors including one or more second steam injection holes for injecting the steam into the plurality of trapped vortex cavities.

The turbine engine of any preceding clause, the plurality of trapped vortex cavities being disposed axially aft of the annular dome.

The turbine engine of any preceding clause, further comprising a plurality of steam injectors.

The turbine engine of any preceding clause, the plurality of steam injectors including a first steam injector disposed through the annular dome to inject the steam into the main chamber.

The turbine engine of any preceding clause, the plurality of steam injectors including a second steam injector disposed to inject the steam into the first trapped vortex cavity downstream of the combustion zone.

The turbine engine of any preceding clause, the plurality of steam injectors including a third steam injector disposed to inject the steam into the second trapped vortex cavity downstream of the combustion zone.

The turbine engine of any preceding clause, the one or more trapped vortex cavity air holes being disposed through the second wall of each trapped vortex cavity.

The turbine engine of any preceding clause, the first steam injector injecting the steam upstream of the trapped vortex cavity opening of the plurality of trapped vortex cavities.

The turbine engine of any preceding clause, the plurality of trapped vortex cavities being disposed in the outer liner.

The turbine engine of any preceding clause, the plurality of trapped vortex cavities being disposed in the inner liner.

A combustor comprising a main chamber including an outer liner and an inner liner, and a trapped vortex cavity extending from at least one of the outer liner or the inner liner, a plurality of mixing assemblies that operably injects a fuel-air mixture into the trapped vortex cavity to produce combustion gases, the trapped vortex cavity injecting the combustion gases into the main chamber, and a steam system in fluid communication with the main chamber, the steam system operably injecting steam into the main chamber such that the steam flows downstream of the trapped vortex cavity.

The combustor of the preceding clause, a water-to-air ratio of the steam and compressed air in the main chamber being 0.0% to 60%.

The combustor of any preceding clause, the water-to-air ratio of the steam and compressed air in the main chamber being 5% to 60%.

The combustor of any preceding clause, the main chamber being defined downstream of the trapped vortex cavity.

The combustor of any preceding clause, the steam system injecting the steam downstream of the trapped vortex cavity.

The combustor of any preceding clause, the plurality of mixing assemblies including a plurality of fuel injectors that operably injects the fuel into the trapped vortex cavity.

The combustor of any preceding clause, the trapped vortex cavity defining a combustion zone, the combustion gases being produced in the combustion zone, and the steam system injecting the steam into the main chamber such that the combustion gases flow from the combustion zone towards the steam in the main chamber The combustor of any preceding clause, the trapped vortex cavity defining a trapped vortex cavity opening such that the trapped vortex cavity is in fluid communication with the main chamber, and the trapped vortex cavity injects the combustion gases through the trapped vortex cavity opening into the main chamber.

The combustor of any preceding clause, the main chamber mixes the combustion gases with the steam to generate a steam-combustion gases mixture in the main chamber.

The combustor of any preceding clause, the main chamber generating the steam-combustion gases mixture downstream of the trapped vortex cavity.

The combustor of any preceding clause, the trapped vortex cavity including one or more walls and one or more trapped vortex cavity air holes disposed in at least one of the one or more walls, the one or more trapped vortex cavity air holes operably directing compressed air into the trapped vortex cavity.

The combustor of any preceding clause, the one or more trapped vortex cavity air holes operably directing the compressed air into the trapped vortex cavity to generate a vortex in the trapped vortex cavity.

The combustor of any preceding clause, the steam system including one or more steam lines for providing the steam to a steam injector.

The combustor of any preceding clause, the steam system generating steam from exhaust of the turbine engine.

The combustor of any preceding clause, the steam system including one or more liner steam holes in the outer liner or the outer liner, the one or more liner steam holes operably directing the steam through the outer liner or the inner liner into the main chamber.

The combustor of any preceding clause, the plurality of mixing assemblies including a plurality of fuel injectors.

The combustor of any preceding clause, the plurality of fuel injectors including a first fuel injector and a second fuel injector.

The combustor of any preceding clause, the first fuel injector including one or more first fuel injection holes that operably inject the fuel radially outward.

The combustor of any preceding clause, the second fuel injector including one or more second fuel injection holes that operably inject the fuel radially inward.

The combustor of any preceding clause, the steam system further comprising one or more steam injectors.

The combustor of any preceding clause, the one or more steam injectors being coupled with the plurality of mixing assemblies.

The combustor of any preceding clause, the one or more steam injectors including one or more steam injection holes for operably injecting the steam therethrough.

The combustor of any preceding clause, the one or more steam injection holes being located on the one or more steam injectors to operably inject the steam axially aftward into the main chamber.

The combustor of any preceding clause, the one or more steam injection holes being located on the one or more steam injectors to operably inject the steam radially into the main chamber.

The combustor of any preceding clause, the trapped vortex cavity including a plurality of trapped vortex cavities.

The combustor of the preceding clause, the plurality of trapped vortex cavities including a first trapped vortex cavity and a second trapped vortex cavity.

The combustor of any preceding clause, the plurality of fuel injectors being positioned to inject the fuel radially into each trapped vortex cavity.

The combustor of any preceding clause, each trapped vortex cavity being defined by a first wall, a second wall, and a third wall.

The combustor of the preceding clause, each trapped vortex cavity being further defined by a fourth wall.

The combustor of any preceding clause, each trapped vortex cavity having a generally rectangular cross section.

The combustor of any preceding clause, each trapped vortex cavity having a generally circular cross section.

The combustor of any preceding clause, further comprising an annular dome positioned at a forward end of the outer liner or the inner liner.

The combustor of any preceding clause, the plurality of fuel injectors extending through the annular dome to separate the first trapped vortex cavity and the second trapped vortex cavity.

The combustor of any preceding clause, the plurality of fuel injectors being disposed between the fourth wall of the first trapped vortex cavity and the fourth wall of the second trapped vortex cavity.

The combustor of any preceding clause, each trapped vortex cavity being located radially outward from the main chamber.

The combustor of any preceding clause, the main chamber being defined downstream of the plurality of trapped vortex cavities.

The combustor of any preceding clause, the outer liner and the inner liner being angled towards each other to define a converging nozzle.

The combustor of any preceding clause, the one or more liner steam holes being positioned axially aft of the plurality of trapped vortex cavities.

The combustor of any preceding clause, the one or more trapped vortex cavity air holes defined through the first wall of each trapped vortex cavity.

The combustor of any preceding clause, the plurality of fuel injectors injecting the fuel radially into each trapped vortex cavity to generate a fuel stream within each trapped vortex cavity.

The combustor of any preceding clause, the one or more trapped vortex cavity air holes operably injecting the compressed air into each trapped vortex cavity.

The combustor of any preceding clause, each trapped vortex cavity mixing the fuel and the compressed air to generate the fuel-air mixture.

The combustor of any preceding clause, the one or more trapped vortex cavity air holes operably injecting the compressed air axially aftward into each trapped vortex cavity.

The combustor of any preceding clause, the one or more steam injectors operably injecting the steam to generate a first steam stream in the main chamber.

The combustor of the preceding clause, the one or more liner steam holes operably injecting the steam into the main chamber to generate a second steam stream in the main chamber.

The combustor of any preceding clause, the combustor operably mixing the combustion gases with the first steam stream and the second steam stream to generate a steam-combustion gases mixture.

The combustor of any preceding clause, the one or more liner steam holes being angled such that the second steam stream is angled other than ninety degrees with respect to a longitudinal centerline axis of the combustor.

The combustor of any preceding clause, further comprising a combustor outlet at an aft end of the main chamber.

The combustor of any preceding clause, the main chamber operably directing the steam-combustion gases mixture through the combustor outlet.

The combustor of any preceding clause, the steam system not injecting the steam into the main chamber during a low-power operation of the turbine engine.

The combustor of any preceding clause, a water-to-air ratio varying from 0.0% to 60% based on the operating conditions of the turbine engine.

The combustor of any preceding clause, the water-to-air being zero percent to thirty percent (0% to 30%) during low-power conditions, being one percent to forty percent (1% to 40%) during mid-power conditions, and being two percent to sixty percent (2% to 60%) during high-power conditions.

The combustor of any preceding clause, the one or more trapped vortex cavity air holes including a plurality of discrete air holes.

The combustor of any preceding clause, the plurality of fuel injectors being annular about the longitudinal centerline axis.

The combustor of any preceding clause, the one or more fuel injection holes including a plurality of discreate fuel injection holes that are spaced circumferentially about the plurality of fuel injectors.

The combustor of any preceding clause, the one or more steam injectors being annular about the longitudinal centerline axis.

The combustor of any preceding clause, the one or more fuel injection holes and the one or more steam injection holes alternating circumferentially about the plurality of fuel injectors such that the fuel and the steam are injected radially into the plurality of trapped vortex cavities.

The combustor of any preceding clause, the one or more liner steam holes including a plurality of discrete liner steam holes that is spaced circumferentially about the outer liner or the inner liner.

The combustor of any preceding clause, the plurality of trapped vortex cavities being annular about the plurality of fuel injectors.

The combustor of any preceding clause, the plurality of fuel injectors being cylindrical.

The combustor of any preceding clause, the plurality of fuel injectors including a first fuel injector disposed to inject the fuel into the first trapped vortex cavity.

The combustor of any preceding clause, the plurality of fuel injectors including a second fuel injector disposed to inject the fuel into the second trapped vortex cavity.

The combustor of any preceding clause, the first fuel injector being disposed through the first wall of the first trapped vortex cavity such that the first fuel injector injects the fuel axially aftward into the first trapped vortex cavity.

The combustor of any preceding clause, the second fuel injector being disposed through the first wall of the second trapped vortex cavity such that the second fuel injector injects the fuel axially aftward into the second trapped vortex cavity.

The combustor of any preceding clause, the first fuel injector being disposed through the third wall of the first trapped vortex cavity such that the first fuel injector injects the fuel radially into the first trapped vortex cavity.

The combustor of any preceding clause, the second fuel injector being disposed through the third wall of the second trapped vortex cavity such that the second fuel injector injects the fuel radially into the second trapped vortex cavity.

The combustor of any preceding clause, further comprising a liner extension portion that extends from the fourth wall of the first trapped vortex cavity to the fourth wall of the second trapped vortex cavity.

The combustor of any preceding clause, the fourth wall of the first trapped vortex cavity being spaced from the fourth wall of the second trapped vortex cavity such that a gap is defined between the fourth wall of the first trapped vortex cavity and the fourth wall of the second trapped vortex cavity.

The combustor of any preceding clause, the one or more steam injectors including a first steam injector disposed to inject the steam into the first trapped vortex cavity.

The combustor of any preceding clause, the one or more steam injectors including a second steam injector disposed to inject the steam into the second trapped vortex cavity.

The combustor of any preceding clause, the first steam injector being disposed through the third wall of the first trapped vortex cavity to inject the steam radially into the first trapped vortex cavity.

The combustor of any preceding clause, the first steam injector being disposed through the third wall of the second trapped vortex cavity to inject the steam radially into the second trapped vortex cavity.

The combustor of any preceding clause, the one or more steam injectors being disposed to inject the steam into the first trapped vortex cavity.

The combustor of any preceding clause, the one or more steam injectors being disposed through the third wall of the first trapped vortex cavity to inject the steam radially into the first trapped vortex cavity.

The combustor of any preceding clause, the plurality of fuel injectors being disposed in the gap defined between the fourth wall of the first trapped vortex cavity and the fourth wall of the second trapped vortex cavity.

The combustor of any preceding clause, the plurality of fuel injectors including the one or more fuel injection holes for injecting the fuel therethrough.

The combustor of any preceding clause, the one or more fuel injection holes being disposed to inject the fuel radially into the plurality of trapped vortex cavities.

The combustor of any preceding clause, the one or more fuel injection holes including one or more first fuel injection holes for injecting the fuel into the first trapped vortex cavity.

The combustor of any preceding clause, the one or more fuel injection holes including one or more second fuel injection holes for injecting the fuel into the second trapped vortex cavity.

The combustor of any preceding clause, the one or more fuel injection holes including one or more third fuel injection holes for injecting the fuel axially into the main chamber.

The combustor of any preceding clause, the fuel stream in the plurality of trapped vortex cavities being a first fuel stream, the one or more fuel injectors injecting the fuel through the one or more third fuel injection holes to generate a second fuel stream to generate a second fuel-air mixture in the main chamber.

The combustor of any preceding clause, the one or more steam injectors being disposed through the gap between the fourth wall of the first trapped vortex cavity and the fourth wall of the second trapped vortex cavity.

The combustor of any preceding clause, the one or more steam injectors including one or more first steam injection holes for injecting the steam axially into the main chamber.

The combustor of any preceding clause, the one or more steam injectors including one or more second steam injection holes for injecting the steam into the plurality of trapped vortex cavities.

The combustor of any preceding clause, the plurality of trapped vortex cavities being disposed axially aft of the annular dome.

The combustor of any preceding clause, further comprising a plurality of steam injectors.

The combustor of any preceding clause, the plurality of steam injectors including a first steam injector disposed through the annular dome to inject the steam into the main chamber.

The combustor of any preceding clause, the plurality of steam injectors including a second steam injector disposed to inject the steam into the first trapped vortex cavity downstream of the combustion zone.

The combustor of any preceding clause, the plurality of steam injectors including a third steam injector disposed to inject the steam into the second trapped vortex cavity downstream of the combustion zone.

The combustor of any preceding clause, the one or more trapped vortex cavity air holes being disposed through the second wall of each trapped vortex cavity.

The combustor of any preceding clause, the first steam injector injecting the steam upstream of the trapped vortex cavity opening of the plurality of trapped vortex cavities.

The combustor of any preceding clause, the plurality of trapped vortex cavities being disposed in the outer liner.

The combustor of any preceding clause, the plurality of trapped vortex cavities being disposed in the inner liner.

A method of operating the combustor of any preceding clause, the method comprising generating the fuel-air mixture with the plurality of mixing assemblies, injecting the fuel-air mixture into the trapped vortex cavity to generate a flame that produces combustion gases within the trapped vortex cavity, injecting the combustion gases into the main chamber, injecting the steam with the steam system into the main chamber, and causing the steam to flow downstream of the trapped vortex cavity.

The method of the preceding clause, further comprising injecting the steam with the steam system during a mid-power operation of the combustor and during a high-power operation of the combustor.

The method of any preceding clause, further comprising injecting the steam such that a water-to-air ratio of the steam to compressed air in the main chamber is 0.0% to 60%.

The method of any preceding clause, the water-to-air ratio of the steam and compressed air in the main chamber being 5% to 60%.

The method of any preceding clause, the trapped vortex cavity defining a combustion zone, and the method further comprises producing the combustions into the combustion zone, and causing the combustion gases to flow from the combustion zone towards the steam in the main chamber.

The method of any preceding clause, further comprising injecting compressed air into the trapped vortex cavity.

The method of any preceding clause, further comprising generating a vortex in the trapped vortex cavity with the compressed air.

The method of any preceding clause, further comprising injecting the combustion gases from the trapped vortex cavity into the main chamber.

The method of any preceding clause, further comprising mixing the combustion with the steam to generate a steam-combustion gases mixture in the main chamber.

The method of any preceding clause, further comprising generating the steam-combustion gases mixture downstream of the trapped vortex cavity.

The method of any preceding clause, further comprising providing the steam to the combustor through one or more steam lines.

The method of any preceding clause, further comprising generating the steam from exhaust of the combustor.

The method of any preceding clause, the steam system including one or more liner steam holes in the outer liner or the inner liner, the method further comprising directing the steam through the one or more liner steam holes into the main chamber.

The method of any preceding clause, the plurality of mixing assemblies including a plurality of fuel injectors.

The method of any preceding clause, the plurality of fuel injectors including a first fuel injector and a second fuel injector.

The method of any preceding clause, the first fuel injector including one or more first fuel injection holes, the method further comprising injecting the fuel radially outward through the one or more first fuel injection holes.

The method of any preceding clause, the second fuel injector including one or more second fuel injection holes, the method further comprising injecting the fuel radially inward through the one or more second fuel injection holes.

The method of any preceding clause, the steam system further comprising one or more steam injectors.

The method of any preceding clause, the one or more steam injectors being coupled with the plurality of mixing assemblies.

The method of any preceding clause, the one or more steam injectors including one or more steam injection holes, the method further comprising injecting the steam through the one or more steam injection holes.

The method of any preceding clause, further comprising injecting the steam axially aftward into the main chamber.

The method of any preceding clause, further comprising injecting the steam radially into the main chamber.

The method of any preceding clause, the trapped vortex cavity including a plurality of trapped vortex cavities.

The method of the preceding clause, the plurality of trapped vortex cavities including a first trapped vortex cavity and a second trapped vortex cavity.

The method of any preceding clause, further comprising injecting the fuel radially into each trapped vortex cavity.

The method of any preceding clause, each trapped vortex cavity being defined by a first wall, a second wall, and a third wall.

The method of the preceding clause, each trapped vortex cavity being further defined by a fourth wall.

The method of any preceding clause, each trapped vortex cavity having a generally rectangular cross section.

The method of any preceding clause, each trapped vortex cavity having a generally circular cross section.

The method of any preceding clause, further comprising an annular dome positioned at a forward end of the outer liner or the inner liner.

The method of any preceding clause, the plurality of fuel injectors extending through the annular dome to separate the first trapped vortex cavity and the second trapped vortex cavity.

The method of any preceding clause, the plurality of fuel injectors being disposed between the fourth wall of the first trapped vortex cavity and the fourth wall of the second trapped vortex cavity.

The method of any preceding clause, each trapped vortex cavity being located radially outward from the main chamber.

The method of any preceding clause, the main chamber being defined downstream of the plurality of trapped vortex cavities.

The method of any preceding clause, the outer liner and the inner liner being angled towards each other to define a converging nozzle.

The method of any preceding clause, further comprising injecting the steam through the one or more liner steam holes axially aft of the plurality of trapped vortex cavities.

The method of any preceding clause, the one or more trapped vortex cavity air holes defined through the first wall of each trapped vortex cavity.

The method of any preceding clause, further comprising injecting the fuel radially into each trapped vortex cavity to generate a fuel stream within each trapped vortex cavity.

The method of any preceding clause, further comprising injecting the compressed air through the one or more trapped vortex cavity air holes into each trapped vortex cavity.

The method of any preceding clause, further comprising mixing the fuel and the compressed air in each trapped vortex cavity to generate the fuel-air mixture.

The method of any preceding clause, further comprising injecting the compressed air axially aftward into each trapped vortex cavity.

The method of any preceding clause, further comprising injecting the steam with the one or more steam injectors to generate a first steam stream in the main chamber.

The method of any preceding clause, further comprising injecting the steam through the one or more liner steam holes into the main chamber to generate a second steam stream in the main chamber.

The method of any preceding clause, further comprising mixing the combustion gases with the first steam stream and the second steam stream to generate a steam-combustion gases mixture.

The method of any preceding clause, further comprising injecting the second steam stream at an angle other than ninety degrees with respect to a longitudinal centerline axis of the combustor.

The method of any preceding clause, further comprising a combustor outlet at an aft end of the main chamber.

The method of the preceding clause, further comprising directing the steam-combustion gases mixture through the combustor outlet.

The method of any preceding clause, further comprising injecting no steam into the main chamber during a low-power operation of the turbine engine.

The method of any preceding clause, the water-to-air ratio varying from 0.0% to 60% based on the operating conditions of the turbine engine.

The method of any preceding clause, the water-to-air ratio being zero percent to thirty percent (0% to 30%) during low-power conditions, being one percent to forty percent (1% to 40%) during mid-power conditions, and being two percent to sixty percent (2% to 60%) during high-power conditions.

The method of any preceding clause, the one or more trapped vortex cavity air holes including a plurality of discrete air holes.

The method of any preceding clause, the plurality of fuel injectors being annular about the longitudinal centerline axis.

The method of any preceding clause, the one or more fuel injection holes including a plurality of discreate fuel injection holes that is spaced circumferentially about the plurality of fuel injectors.

The method of any preceding clause, the one or more steam injectors being annular about the longitudinal centerline axis.

The method of any preceding clause, the method further comprising injecting the fuel and the steam radially into the plurality of trapped vortex cavities.

The method of any preceding clause, the one or more liner steam holes including a plurality of discrete liner steam holes that are spaced circumferentially about the outer liner or the inner liner.

The method of any preceding clause, the plurality of trapped vortex cavities being annular about the plurality of fuel injectors.

The method of any preceding clause, the plurality of fuel injectors being cylindrical.

The method of any preceding clause, further comprising injecting the fuel with the first fuel injector into the first trapped vortex cavity.

The method of any preceding clause, further comprising injecting the fuel into the second trapped vortex cavity.

The method of any preceding clause, further comprising injecting the fuel axially aftward the first trapped vortex cavity.

The method of any preceding clause, further comprising injecting the fuel axially aftward into the second trapped vortex cavity.

The method of any preceding clause, further comprising injecting the fuel radially into the first trapped vortex cavity.

The method of any preceding clause, further comprising injecting the fuel radially into the second trapped vortex cavity.

The method of any preceding clause, the combustor further comprising a liner extension portion that extends from the fourth wall of the first trapped vortex cavity to the fourth of the second trapped vortex cavity.

The method of any preceding clause, the fourth wall of the first trapped vortex cavity being spaced from the fourth wall of the second trapped vortex cavity such that a gap is defined between the fourth wall of the first trapped vortex cavity and the fourth wall of the second trapped vortex cavity.

The method of any preceding clause, further comprising injecting the steam into the first trapped vortex cavity.

The method of any preceding clause, further comprising injecting the steam into the second trapped vortex cavity.

The method of any preceding clause, further comprising injecting the steam radially into the first trapped vortex cavity.

The method of any preceding clause, further comprising injecting the steam radially into the second trapped vortex cavity.

The method of any preceding clause, the plurality of fuel injectors being disposed in the gap defined between the fourth wall of the first trapped vortex cavity and the fourth wall of the second trapped vortex cavity.

The method of any preceding clause, the plurality of fuel injectors including the one or more fuel injection holes, the method further comprising injecting the fuel through the one or more fuel injection holes.

The method of any preceding clause, further comprising injecting the fuel radially into the plurality of trapped vortex cavities.

The method of any preceding clause, further comprising injecting the fuel through one or more first fuel injection holes into the first trapped vortex cavity.

The method of any preceding clause, further comprising injecting the fuel through one or more second fuel injection holes into the second trapped vortex cavity.

The method of any preceding clause, further comprising injecting the fuel axially through one or more third fuel injection holes into the main chamber.

The method of any preceding clause, the fuel stream in the plurality of trapped vortex cavities being a first fuel stream, the method further comprising injecting the fuel through the one or more third fuel injection holes to generate a second fuel stream to generate a second fuel-air mixture in the main chamber.

The method of any preceding clause, the one or more steam injectors being disposed through the gap between the fourth wall of the first trapped vortex cavity and the fourth wall of the second trapped vortex cavity.

The method of any preceding clause, further comprising injecting the steam axially through one or more first steam injection holes into the main chamber.

The method of any preceding clause, further comprising injecting the steam through one or more second steam injection holes into the plurality of trapped vortex cavities.

The method of any preceding clause, the plurality of trapped vortex cavities being disposed axially aft of the annular dome.

The method of any preceding clause, further comprising a plurality of steam injectors.

The method of any preceding clause, further comprising injecting the steam with a first steam injector into the main chamber.

The method of any preceding clause, further comprising injecting the steam with a second steam injector into the first trapped vortex cavity downstream of the combustion zone.

The method of any preceding clause, further comprising injecting the steam with a third steam injector into the second trapped vortex cavity downstream of the combustion zone.

The method of any preceding clause, the one or more trapped vortex cavity air holes being disposed through the second wall of each trapped vortex cavity.

The method of any preceding clause, further comprising injecting the steam upstream of the trapped vortex cavity opening of the plurality of trapped vortex cavities.

The method of any preceding clause, the plurality of trapped vortex cavities being disposed in the outer liner.

The method of any preceding clause, the plurality of trapped vortex cavities being disposed in the inner liner.

The method of any preceding clause, further comprising mixing the combustion gases and the second steam stream to generate a first steam-combustion gases mixture in the trapped vortex cavity.

The method of any preceding clause, further comprising injecting the first steam-combustion gases mixture from the trapped vortex cavity into the main chamber.

The method of any preceding clause, further comprising mixing the first steam stream with the first steam-combustion gases mixture to generate a second steam-combustion gases mixture.

The method of any preceding clause, further comprising directing the second steam-combustion gases mixture through the combustor outlet.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A combustor for a turbine engine, the combustor comprising:
   a main chamber including an outer liner and an inner liner;
   one or more trapped vortex cavities extending from at least one of the outer liner or the inner liner;
   a plurality of mixing assemblies configured to inject fuel and air into the one or more trapped vortex cavities to generate a fuel-air mixture in the one or more trapped vortex cavities, the combustor configured to combust the fuel-air mixture to produce combustion gases in the one or more trapped vortex cavities, the one or more trapped vortex cavities providing the combustion gases to the main chamber; and
   a steam system in fluid communication with the main chamber, the steam system including one or more steam injectors, wherein the one or more steam injectors are in flow communication with the plurality of mixing assemblies, and at least one of the one or more steam injectors configured to provide steam to at least one of the one or more trapped vortex cavities to supply the steam to the combustor, to reduce nitrogen oxide emissions and to reduce a specific fuel consumption of the turbine engine.

2. The combustor of claim 1, further comprising an annular dome positioned at a forward end of the outer liner or the inner liner, the annular dome located upstream of the main chamber, and an air injector located in the annular dome configured to inject compressed air in the axial direction into the main chamber, wherein a water-to-air ratio of the steam and the compressed air in the main chamber is zero percent to sixty percent (0% to 60%).

3. The combustor of claim 1, wherein the one or more trapped vortex cavities define one or more trapped vortex cavity openings, the one or more trapped vortex cavity openings defined by an opening in one of the outer liner or the inner liner, such that the one or more trapped vortex cavities are in fluid communication with the main chamber, and the one or more trapped vortex cavities are configured to inject the combustion gases through the one or more trapped vortex cavity openings into the main chamber.

4. The combustor of claim 1, wherein each trapped vortex cavity is located radially above or radially below the main chamber.

5. The combustor of claim 1, further comprising an annular dome positioned at a forward end of the outer liner or the inner liner.

6. The combustor of claim 5, wherein the one or more steam injectors include a first steam injector disposed through the annular dome to inject the steam into the main chamber.

7. A method of operating the combustor of claim 1, the method comprising:
   injecting, using the plurality of mixing assemblies, the fuel and the air into the one or more trapped vortex cavities to generate the fuel-air mixture in the one or more trapped vortex cavities, the fuel-air mixture being combusted in the combustor to produce the combustion gases in the one or more trapped vortex cavities, the one or more trapped vortex cavities providing the combustion gases to the main chamber;
   providing the steam system in fluid communication with the main chamber, the steam system including the one or more steam injectors, wherein the one or more steam injectors are in flow communication with the plurality of mixing assemblies, and at least one of the one or more steam injectors providing the steam to at least one of the one or more trapped vortex cavities to supply the steam to the combustor;
   mixing the combustion gases with the steam to generate a steam-combustion gases mixture; and
   causing the steam-combustion gases mixture to flow downstream of the one or more trapped vortex cavities, to reduce the nitrogen oxide emissions and to reduce the specific fuel consumption of the turbine engine.

8. The method of claim 7, wherein mixing the combustion gases with the steam to generate the steam-combustion gases mixture takes place in the one or more trapped vortex cavities.

9. The method of claim 7, further comprising injecting the steam such that a water-to-air ratio is zero percent to thirty percent (0% to 30%) during a low-power operation of the combustor, the water-to-air ratio is one percent to forty percent (1% to 40%) during a mid-power operation, and the water-to-air ratio is two percent to sixty percent (2% to 60%) during a high-power operation.

10. The combustor of claim 1, wherein the steam system generates steam from exhaust of the turbine engine.

11. A combustor for a turbine engine, the combustor comprising:
- a main chamber including an outer liner and an inner liner;
- an annular dome positioned at a forward end of the outer liner or the inner liner, the annular dome located upstream of the main chamber;
- one or more trapped vortex cavities located downstream of the annular dome and upstream of the main chamber, the one or more trapped vortex cavities extending from at least one of the outer liner or the inner liner, each of the one or more of the trapped vortex cavities including an inner wall located between the inner liner and the outer liner in the radial direction, the inner wall extending axially downstream from the annular dome;
- a plurality of mixing assemblies configured to inject fuel and air into the one or more trapped vortex cavities to generate a fuel-air mixture in the one or more trapped vortex cavities, the combustor configured to combust the fuel-air mixture to produce combustion gases in the one or more trapped vortex cavities, the one or more trapped vortex cavities providing the combustion gases to the main chamber; and
- a steam system in fluid communication with the main chamber, the steam system including one or more liner steam holes in the outer liner, the inner liner, or both the outer liner and the inner liner, and at least one of the one or more liner steam holes providing steam to the main chamber to supply the steam to the combustor, to reduce nitrogen oxide emissions and to reduce a specific fuel consumption of the turbine engine.

12. The combustor of claim 11, further comprising an air orifice located in a forward end of the annular dome configured to direct compressed air in the axial direction into the one or more trapped vortex cavities, or the main chamber, or both, wherein a water-to-air ratio of the steam and the compressed air in the main chamber is zero percent to sixty percent (0% to 60%).

13. The combustor of claim 11, wherein the one or more trapped vortex cavities define one or more trapped vortex cavity openings, the one or more trapped vortex cavity openings defined by an opening in one of the outer liner or the inner liner, such that the one or more trapped vortex cavities are in fluid communication with the main chamber, and the one or more trapped vortex cavities are configured to inject the combustion gases through the one or more trapped vortex cavity openings into the main chamber.

14. The combustor of claim 11, wherein the main chamber is defined downstream of the one or more trapped vortex cavities.

15. The combustor of claim 11, wherein the outer liner and the inner liner are angled towards each other to define a converging nozzle.

16. The combustor of claim 11, wherein a plurality of fuel injectors extends radially inwards or radially outwards from at least one of the inner wall or a combustor outer case, the combustor outer case located radially outwards of the inner liner and the outer liner, the plurality of fuel injectors configured to inject the fuel radially into each trapped vortex cavity to generate a fuel stream within each trapped vortex cavity.

17. A method of operating the combustor of claim 11, the method comprising:
- injecting, using the plurality of mixing assemblies, the fuel and the air into the one or more trapped vortex cavities to generate the fuel-air mixture in the one or more trapped vortex cavities, the fuel-air mixture being combusted in the combustor to produce the combustion gases in the one or more trapped vortex cavities, the one or more trapped vortex cavities providing the combustion gases to the main chamber;
- providing the steam system in fluid communication with the main chamber, the steam system including the one or more liner steam holes in the outer liner, the inner liner, or both the outer liner and the inner liner, and at least one of the one or more liner steam holes providing the steam to the main chamber to supply the steam to the combustor;
- mixing the combustion gases with the steam to generate a steam-combustion gases mixture; and
- causing the steam to flow downstream of the one or more trapped vortex cavities, to reduce the nitrogen oxide emissions and to reduce the specific fuel consumption of the turbine engine.

18. The method of claim 17, wherein mixing the combustion gases with the steam to generate the steam-combustion gases mixture takes place in the main chamber.

19. The method of claim 17, further comprising introducing the steam into the main chamber such that a water-to-air ratio is zero percent to thirty percent (0% to 30%) during a low-power operation of the combustor, the water-to-air ratio is one percent to forty percent (1% to 40%) during a mid-power operation, and the water-to-air ratio is two percent to sixty percent (2% to 60%) during a high-power operation.

20. The combustor of claim 11, wherein the steam system generates steam from exhaust of the turbine engine.

\* \* \* \* \*